United States Patent
Sigler, Jr. et al.

(10) Patent No.: US 7,636,696 B1
(45) Date of Patent: Dec. 22, 2009

(54) SYSTEM, METHOD, AND COMPUTER PROGRAM PRODUCT FOR MAINTAINING CONSUMER PRIVACY AND SECURITY IN ELECTRONIC COMMERCE TRANSACTIONS

(75) Inventors: Charles E. Sigler, Jr., Myersville, MD (US); William Lee Carrens, Springfield, VA (US); Sunny Ramaswamy Dewakar, Springfield, VA (US)

(73) Assignee: Megasoft Consultants, Inc., Herndon, VA (US)

( * ) Notice: Subject to any disclaimer, the term of this patent is extended or adjusted under 35 U.S.C. 154(b) by 735 days.

(21) Appl. No.: 09/715,176

(22) Filed: Nov. 20, 2000

Related U.S. Application Data

(60) Provisional application No. 60/166,408, filed on Nov. 19, 1999.

(51) Int. Cl.
 *G06Q 99/00* (2006.01)
(52) U.S. Cl. .............................. 705/74; 705/64; 705/50; 705/78; 705/79; 713/150
(58) Field of Classification Search ............. 705/64–79; 713/150, 200
 See application file for complete search history.

(56) References Cited

U.S. PATENT DOCUMENTS

| | | | |
|---|---|---|---|
| 6,006,200 A | 12/1999 | Boies et al. | |
| 6,029,150 A | 2/2000 | Kravitz | |
| 6,076,078 A | 6/2000 | Camp et al. | |
| 6,138,107 A | 10/2000 | Elgamal | |
| 6,539,364 B2 * | 3/2003 | Moribatake et al. | 705/69 |
| 7,127,427 B1 * | 10/2006 | Casper | 705/44 |
| 7,398,253 B1 * | 7/2008 | Pinnell | 705/66 |
| 2004/0002903 A1 * | 1/2004 | Stolfo et al. | 705/26 |
| 2006/0247982 A1 * | 11/2006 | Stolfo et al. | 705/26 |

OTHER PUBLICATIONS

Camenisch et al., "An Efficient Fair Payment System", 1996, ACM.*
M. Hodges, MIT's Technology Review, vol. 100, No. 6, pp. 26-27, "Building a Bond of Trust," Aug./Sep. 1997 (Filing edited pp. 1-2 only).
B. Jorgensen, Electronic Business, vol. 26, No. 10, p. 41 +, "Business Trends (Some $13.9 Bil of Electronics Products will be Sold Through B2B E-Marketplaces in 2000)", Oct. 2000 (Filing edited pp. 1-4 only).

\* cited by examiner

*Primary Examiner*—Jalatee Worjloh
(74) *Attorney, Agent, or Firm*—Weingarten, Schurgin, Gagnebin & Lebovici LLP

(57) ABSTRACT

A system, method, and computer program product for maintaining the anonymity of a consumer in a transaction with a retailer. The consumer provides payment method information and ship-to address information to a trusted third party. The consumer purchases products from a retailer by providing the trusted third party anonymous identifiers (e.g., nicknames, unique codes, or one time use codes either supplied by the consumer or by the trusted third party) corresponding to the selected payment methods and ship-to addresses. The retailer requests payment approval from the trusted third party. The trusted third party receives payment approval from a payment partner using the payment method information determined from the anonymous identifier received from the consumer. The trusted third party provides payment approval to the retailer along a transaction unique shipment identifier to place on the parcel. The trusted third party sends the same transaction unique shipment identifier and the actual shipping address determined from the anonymous identifier received from the consumer to a shipping partner who re-labels the package and delivers it to the consumer. The trusted third party acts as an e-mail conduit for messages sent to member consumers.

22 Claims, 16 Drawing Sheets

| Retailer ID 1000 | Consumer ID 1001 |

FIGURE 3A

| Retailer ID 1010 | Consumer ID 1011 | Order ID 1012 | Payment ID 1013 | ShipLocation ID 1014 |

FIGURE 3B

| Transaction ID 1020 | Retailer ID 1021 |

FIGURE 3C

| Transaction ID 1023 | Consumer ID 1024 | Payment ID 1025 | ShipLocation ID 1026 |

FIGURE 3D

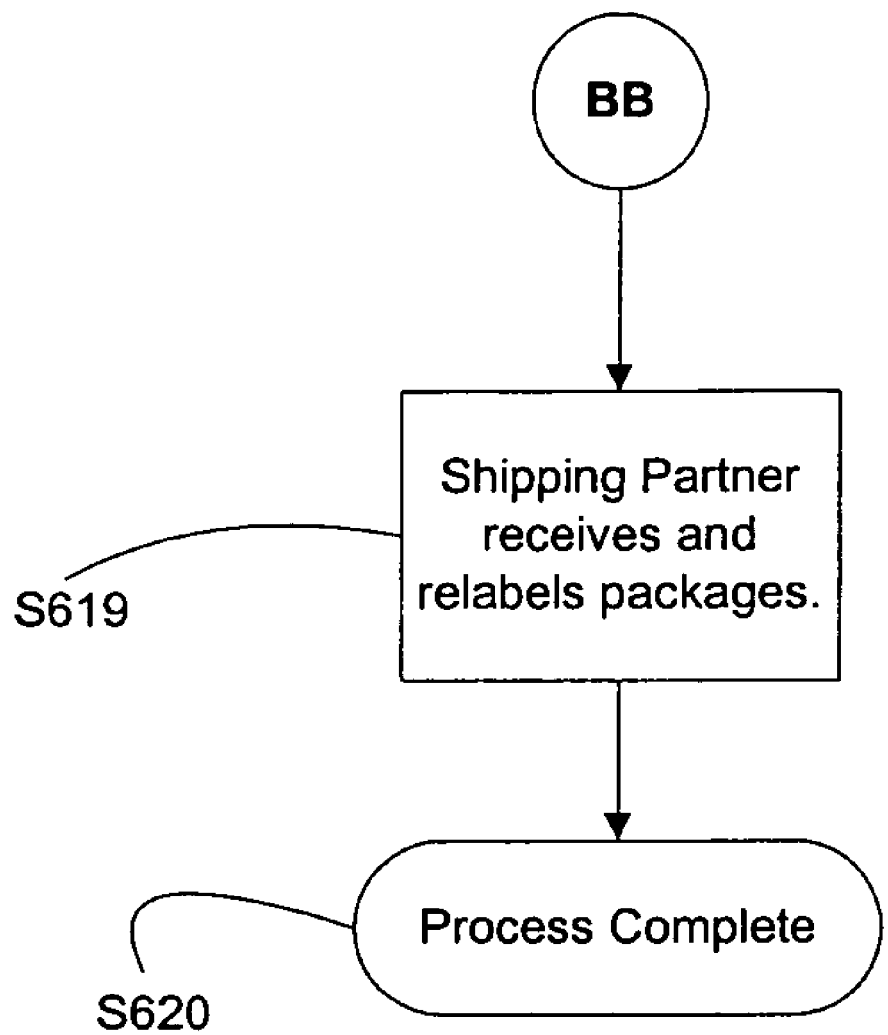

SYSTEM, METHOD, AND COMPUTER PROGRAM PRODUCT FOR MAINTAINING CONSUMER PRIVACY AND SECURITY IN ELECTRONIC COMMERCE TRANSACTIONS

CROSS-REFERENCE TO RELATED PATENT DOCUMENTS

The present document contains subject matter related to that disclosed in commonly owned, co-pending provisional application Ser. No. 60/166,408 filed Nov. 19, 1999, entitled COMPUTER-IMPLEMENTED SECURITY SYSTEM AND METHOD, the entire contents of which are incorporated herein by reference.

BACKGROUND OF THE INVENTION

1. Field of the Invention

The present invention is directed to methods, computer-based systems, and computer program products for maintaining a consumer's privacy and security during commerce transactions.

2. Discussion of the Background

Internet e-commerce has, by the year 2000, grown into a $40 B per year industry in the United States alone. The size of the industry is bounded only by the population and their propensity for shopping. However, as with any new concept, impediments arise that hinder the acceptance of the idea. For e-commerce the major impediment to widespread acceptance has been privacy and security. Privacy and security are also growing concerns for all commerce, including the established brick-and-mortar retailers as well as the established mail order retailers.

The Internet is a great tool for browsing for information on products from competing vendors, for finding vendors that the shopper did not know even existed, and for finding the best deal. However, in order to place a purchase online, the shopper has to divulge an assortment of private and personal information, for example, their name, address, credit card number and expiration, billing address, contact info, shipping address, etc.

Early services, such as Microsoft Passport, made strides in protecting the information in-transit between the consumer and merchant in an e-commerce transaction, but do not address all of the privacy concerns regarding the information that is ultimately provided to the merchant. In other words, the merchant ultimately receives the information, albeit via a secure transaction, and the protection of that information by the merchant, as well as others, is also a concern of consumers. Other early electronic 'wallets' function in a similar fashion, providing a secure transmission of private information to a merchant. Privacy concerns, however, are further-reaching than merely the secure transmission of private information. Consumers are concerned not only with the security of the transmission of information, but also with their privacy as related to the disclosed information after the transaction has been completed. Furthermore, consumers are concerned with the security of information stored by merchants after the transaction has been completed.

In order for e-commerce to realize its potential, consumers must be convinced that they can enter into e-commerce transactions without compromising their privacy or security. As discussed above, consumers of brick-and-mortar retailers and mail order retailers would also like this privacy and security. Attempts to provide security and privacy have, to date, been inadequate. These attempts include services that require the setup of special cash accounts or the purchase of special cards (similar to pre-pay phone cards) for the purchase of goods online. By their nature, these services do not protect the identity of the recipient, as the merchant must be told to whom the purchased product must be shipped. Furthermore, these approaches do not afford the convenience or protection of conventional credit card purchases.

Other attempts have been made to address the privacy concerns of on-line consumers. For example, U.S. Pat. No. 6,006,200 discloses an approach whereby a private shipment number is used as key for decoding an address by a shipping company. This approach is notably flawed for applications to privacy. For example, the ship number that is used for each shipping address is static, and therefore, susceptible to 'data mining' for this string (effectively a database 'key'). If the ship number can be associated with an identity, then this identity can be traced wherever the ship number was used, breaking any privacy protection for the consumer. Other approaches are similarly flawed. In the e-commerce domain, providing an individual with a unique identification code does not conceal that individual's identity, in fact, it facilitates the determination of an individual's identity. Any unique number associated with an individual, or an individual's address, or other attribute of an individual, is analogous to, for example, a social security number or a driver's license number, providing a key through which information concerning that individual may be determined. Accordingly, these unique identifier-based approaches do not comfort potential e-commerce consumers concerned with privacy.

The challenge, then, as presently recognized, is to develop an approach that will provide anonymity and privacy for e-commerce consumers, as well as consumers in general. It would be advantageous if the approach were able to conceal the identity of customers on a per-transaction basis, so that information mining techniques were unable to gather information concerning an individual by mining transactions with common attributes.

SUMMARY OF THE INVENTION

The inventors of the present invention have recognized that currently no methods, systems, or computer program products are available to sufficiently ensure the anonymity of consumers participating in e-commerce transactions. Accordingly, one object of the present invention is to provide a solution to this problem, as well as other problems and deficiencies associated with the security and privacy of e-commerce-based transactions.

The inventors of the present invention have recognized that a major impediment to e-commerce acceptance by a significant portion of the population lay in the necessary invasion of privacy needed to complete a transaction. Accordingly, a further object of the present invention is to provide a system through which an individual's privacy may be maintained throughout any commercial transaction. Moreover, the present invention is applicable to any commercial transaction between a buyer and a seller, both in electronic commerce and traditional commerce (e.g., brick and mortar commerce, catalog order commerce, etc.).

The inventors of the present invention have further recognized that by separating the payment mechanism from the transaction approval process in a commercial transaction, the merchant can complete the transaction once it is has been approved, without being involved with the payment process. By guarantying payment to merchants, the system of the present invention provides an advantage of shielding the consumer's identity from the merchant. The inventors of the present invention have developed an approach to commerce that limits the disclosure of a consumer's identity to a single trusted entity and enables that consumer to transact anonymously with many merchants. Moreover, the single trusted entity can accept, with the aid of appropriate payment processors, a wide range of electronic payment vehicles (e.g. credit card, debit card, private label card, electronic check, micropayment, bank account, funded cash account, etc.), which provides an advantage to consumers looking for a range of payment options.

The above described and other objects are addressed by the present invention which includes a novel computer-based system, method, and computer program product that provides commerce consumers the ability to transact with merchants anonymously.

In one embodiment, the present invention is implemented to allow consumers to purchase anonymously from participating retailers while preserving the financial integrity of the transaction. The present inventors recognized that to provide anonymous purchases and provide complete privacy protection, all aspects of the transaction had to be secured and protected, including the shipping address or addresses. To protect consumer's shipping information and, ultimately their privacy, the present inventors have developed a novel privacy shipping method. This method includes a trusted third party sending only an alphanumeric ship-to number to the retailer, as opposed to conventional shipping information such as name, address, etc. The ship-to number is converted into human and machine-readable (e.g., a barcode) by a retailer fulfillment processor and then placed on the package(s) in the order. The retailer then returns package information (e.g., package weight, dimensions, etc.) to the trusted third party. The trusted third party then forwards translation information to a shipping or pick-up agent. The translation information is used locally by the shipper to determine the destination for the package. The shipper picks up the package, scans the barcode and, using translation information 'pushed' by the trusted third party, determines the destination for the parcel. The ship-to numbers are used for a single transaction (which may in some cases include multiple parcels) only. Accordingly, the inventive system and methods has alleviated the need for the retailer to ever have the consumer's identity revealed to them.

The present invention also allows for the personalization of retailer sites for e-commerce customers of the trusted third party. The present inventors have developed a novel approach for enabling the customization of a retailer site without compromising a consumer's privacy. By providing a unique identifier for each retailer/consumer pair, consumers may be uniquely identified to a retailer without compromising their identity as to other retailers, since for other retailers, the unique identifier for that retailer/consumer pair will be different. Accordingly, the present invention provides a solution which enables consumers to experience a rich and tailored web experience while protecting their anonymity. Further, certain consumers may not wish for customized service. For these consumers, a unique identifier for the consumer/retailer pair will be generated for each purchase.

The present invention also recognizes the need to protect the electronic mail address of consumers while maintaining an electronic mail capability for the retailer to comply with Federal Trade Commission reporting requirements for order and shipping status. Accordingly, the present invention provides a solution which enables retailers to electronically mail notifications to consumers while protecting the consumer's actual electronic mail address. This electronic e-mail redirection uses the unique identifier for each retailer/consumer pair to enable the retailer to anonymously direct e-mail to the consumer.

The present invention provides the ability for consumers to shop at participating merchants in complete privacy, not unlike using cash at a brick and mortar establishment. The consumer's privacy is maintained even if various merchants attempt to pool their information in an attempt to harvest additional information regarding their consumers. With conventional third party solutions, as discussed above, a consumer's identity may be ascertained by their common assigned identifier.

The present invention provides a one-time use number for each consumer transaction, regardless of shipping address. As such, if privacy were to be compromised at one site for one transaction, it would not propagate to other retailers and datamining firms. Further, if the e-commerce consumer has elected to forgo site customization, compromise would not propagate to past purchases from that retailer. Accordingly, the inventive system serves to confine the exposure of online consumers to individual transactions.

The present invention also provides a novel approach to concealing a consumer's payment vehicle from the merchant. In this way, the use of many varied forms of payment are transparent to the merchant. As the trusted third party becomes enabled for new payment vehicles, the merchants will also be enabled to accept these vehicles for transactions including the trusted third party without the need for costly implementation themselves. By hiding the payment methods from the merchants, the present invention also allows for the implementation of micropayments while maintaining complete privacy of the consumer. Similarly, the present invention allows for members to set up funded cash accounts which can also be used while maintaining complete privacy.

Consistent with the title of this section, the above summary is not intended to be an exhaustive discussion of all the features or embodiments of the present invention. A more complete, although not necessarily exhaustive, description of the features and embodiments of the invention is found in the section entitled "DESCRIPTION OF THE PREFERRED EMBODIMENTS."

BRIEF DESCRIPTION OF THE DRAWINGS

A more complete appreciation of the present invention, and many of the attendant advantages thereof, will be readily obtained as the same becomes better understood by reference to the following detailed description when considered in connection with the accompanying drawings, wherein:

FIG. 3A is an exemplary data field structure showing a retailer/consumer record;

FIG. 3B is an exemplary data field structure showing an online shopper record;

FIG. 3C is an exemplary data field structure showing records having a unique transaction ID as an identifier;

FIG. 3D is a further exemplary data field structure showing records having a unique transaction ID as an identifier;

FIGS. 6A, 6B, and 6C are a flow diagram of one embodiment of a purchase transaction process according to the present invention;

DESCRIPTION OF THE PREFERRED EMBODIMENTS

Figure 1:
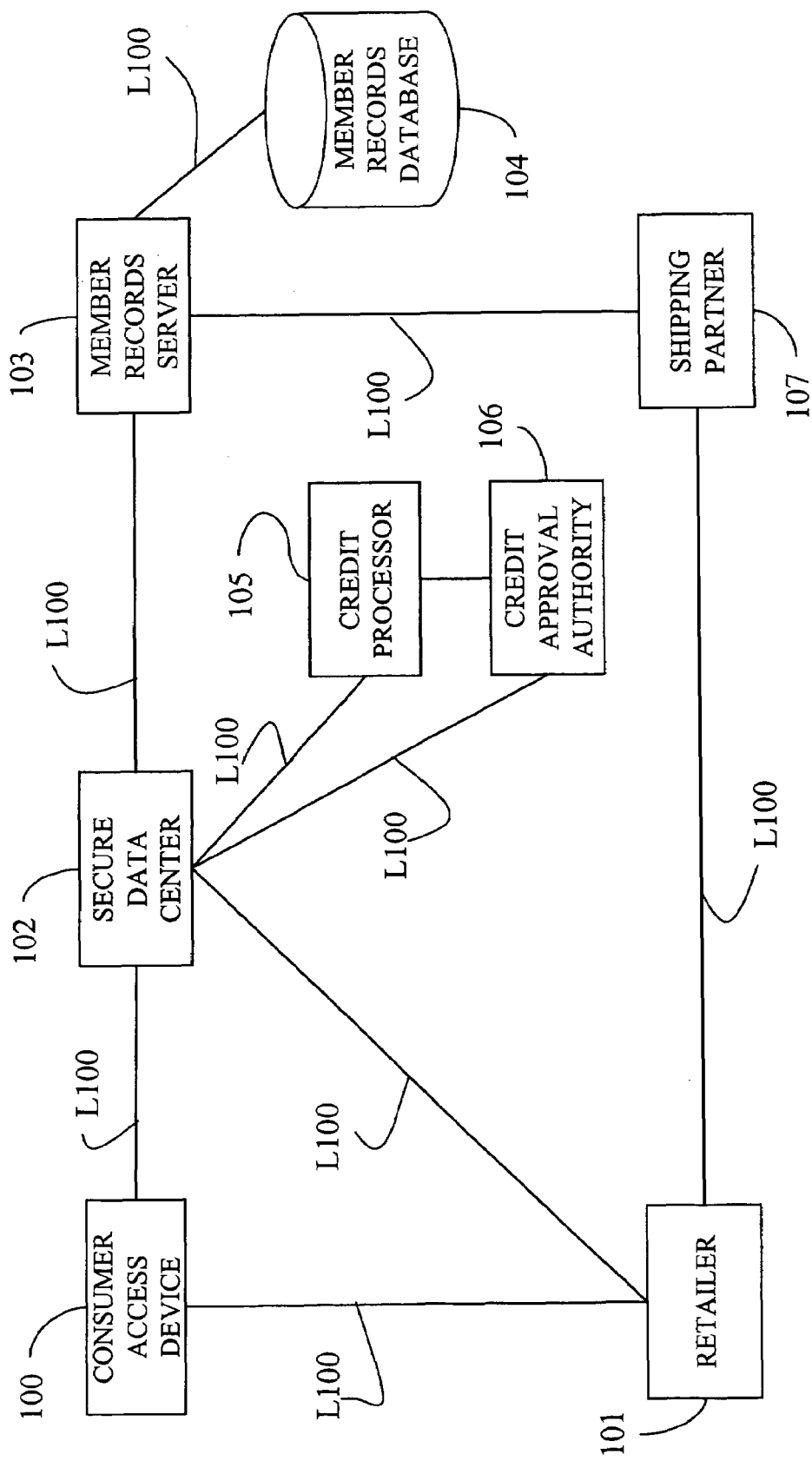
FIG. 1 is a block diagram of an overall system configuration in one embodiment of the present invention.

Referring now to the figures, and more particularly to FIG. 1 thereof, which is a block diagram of a system for maintaining the privacy of consumers in online transactions. The present embodiment is discussed in the context of privacy and security in e-commerce transactions. However, the invention may be used in other contexts, for example, transactions with brick-and-mortar retailers, mail order retailers, or other conventional commercial settings where consumers would like to have privacy and security maintained. The present invention would be applicable to any commercial transaction where privacy and security is a concern to consumers. The system includes a consumer access device 100, a retailer 101, a secure data center 102, a member records server 103, a member records database 104, a credit processor 105, a credit approval authority 106, and a shipping partner 107 linked together via a network L100.

The member records database 104 is a digital repository that may be implemented, for example, through a commercially available relational database management system (RDBMS) based on the structured query language (SQL) such as ORACLE, DB2, SYBASE, INFORMIX, or MICROSOFT SQL SERVER, through an object-oriented database management system (ODBMS), or through custom database management software. In one embodiment, the member records database 104 includes information through which the trusted third party may manage the anonymity of members participating in online transactions.

The information in the member records database 104 is maintained by processes running on the member records server 103. The member records server 103 is implemented using the computer system 1001 of FIG. 10, for example, but also may be any other suitable personal computer (PC), workstation, server, or device for communicating with the secured data center 102, the credit processor 105, and the shipping partner 107, and storing and retrieving information in the member records database 104. The member records database 104 may reside on a storage device of the member records server 103, or reside on another device connected to the member records server 103, for example, by way of a local area network, or other communications link such as virtual private network, wireless link, or internet-enabled link.

Figure 10:
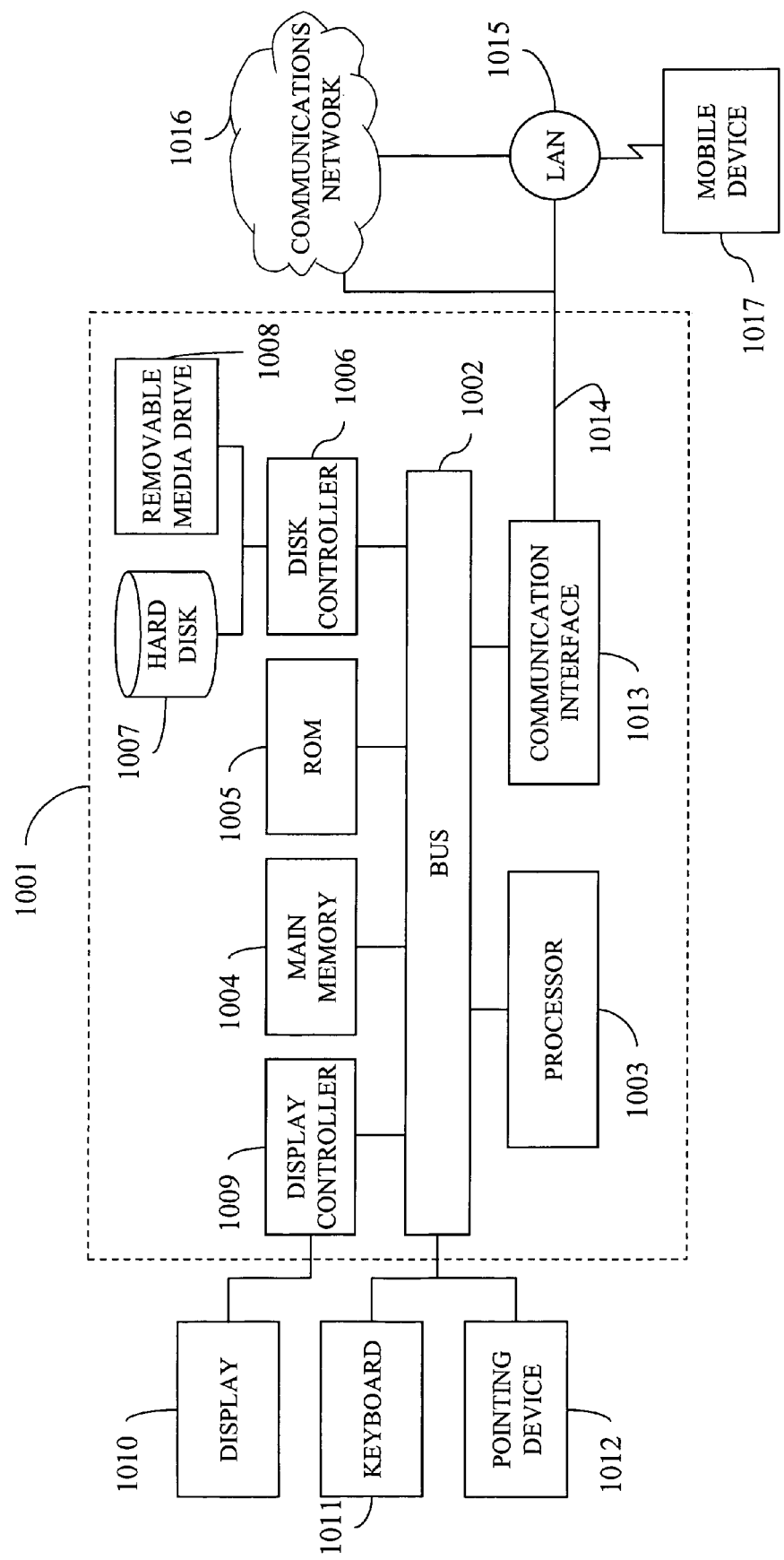
FIG. 10 is an exemplary computer system programmed to perform one or more of the special purpose functions of the present invention.

The consumer access device 100 may be implemented using the computer system 1001 of FIG. 10, for example, or any other suitable PC, workstation, personal data assistant (PDA), server, or other device for communicating with an retailer 101, or the secured data center 102. The consumer access device 100 is used by a consumer to access retailer 101 sites over a network L100. In one embodiment, the network L100 is the Internet. Upon selecting items to be purchase from the retailer 101, the consumer proceeds to the retailer 101 checkout page for completing the transaction.

In one embodiment, the retailer 101 has added a button on his checkout page for use by consumers which are members of a trusted third party responsible for protecting the consumers privacy in online transactions. In one embodiment, the checkout page of the retailer would be a graphical presentation which was written in a standard markup language. Markup languages are used, for example, to describe the layout of a page that is presented to a user, as would be understood by one of ordinary skill in the software art. Markup languages are discussed in Gralla, P. "How the Internet Works," Que, August 1999, the entire contents of which are incorporated herein by reference. In one embodiment, when member consumers select the button on the retailer 101 checkout page, the trusted third party privacy shield client software (e.g., a "plug-in") is activated on the consumer access device 100. In an alternative embodiment, when checkout is selected by a consumer, the client software operating on processors at the trusted third party facility is accessed via the consumer access device 100. The consumer may select the button with any type of pointing device, as would be understood by one of ordinary skill in the software art. Pointing devices are described in White, R., "How Computers Work," Que, September 1999, the entire contents of which are incorporated herein by reference. In another embodiment, the trusted third party has added specialized code to the site of the retailer 101, so that when the normal checkout button is activated, it detects the presence of the trusted third party privacy shield client software on the consumer access device 100, and activates that software.

In one embodiment, the privacy shield software queries the consumer for his pass phrase which was given to consumer by the trusted third party as an identifier that he is who he says he is. Once the consumer has adequately identified themselves, the secure data center 102 sends the consumer a list of anonymous payment methods and shipping addresses which have been queried from the member records database 104 by the member records server 103. The anonymous payment methods and shipping addresses are displayed on the consumer workstation 100. The consumer than selects a shipping address and a payment method from the list presented to the consumer. The secure data center 102 also sends the consumer a one-time use transaction identifier which identifies the particular transaction that is now occurring.

In another embodiment, the consumer is directed to the trusted third party's site where the site queries the consumer for his pass phrase which was given to consumer by the trusted third party as an identifier that he is who he says he is. Once the consumer has adequately identified themselves, the secure data center 102 sends the consumer a list of anonymous payment methods and anonymous shipping addresses which have been queried from the member records database 104 by the member records server 103. The anonymous payment methods and anonymous shipping addresses are displayed on the consumer access device 100. The consumer then selects a shipping address and a payment method from the list presented to the consumer. The secure data center 102 also sends the consumer a one-time use transaction identifier which identifies the particular transaction that is now occurring.

The shipping addresses and payment methods are anonymous because they are identified by label only. For example, rather than presenting an address of the consumer's residence, the address will be presented as simply "home." Similarly, rather than presenting a credit card number as a payment method, the payment method may be presented as simply "primary." These labels are controlled by the consumer and, in one embodiment, are never disclosed beyond the trusted third party. In another embodiment, these labels are revealed to the retailer 101 as a reference for the consumer. In both embodiments, neither actual shipping address nor the actual payment method information (e.g., credit card information) are revealed to the retailer 101.

Once the consumer has selected which anonymous shipping address and which anonymous payment method to use for a particular transaction, in one embodiment, the anonymous shipping address, the anonymous payment method, the one-time use transaction identifier, and a city, state, and zip code corresponding to the selected anonymous shipping address are sent to the retailer 101 so that the checkout process may be completed. In another embodiment, only the one-time use transaction identifier and a city, state, and zip code are sent to the retailer 101, while the anonymous payment and anonymous shipping address are sent from the consumer, directly to the trusted third party. In one embodiment, the above information is sent by the secure data center 102 to the retailer 101. In another embodiment, the information is sent by the consumer access device 100 to the retailer 101. The retailer 101 uses this information to generate tax amount, shipping amount, and a final transaction cost, which is then sent back to the trusted third party via the secure data center 102 as request for authorization of payment.

The trusted third party recognizes the transaction by the one-time use transaction identifier to query the member records database 104 via the member records server 103 to identify the actual payment method. Once the trusted third party has determined the actual payment method to be used, the trusted third party will perform an internal fraud verification via the secure data center 102. If fraud scoring indicates fraud, the transaction will be terminated. If the fraud score indicates a potential for fraud, the consumer will be asked to provide additional information for transaction verification purposes. In one embodiment, after an acceptable fraud scoring has been determined, the payment information is sent to the credit processor 105 to seek credit approval. The credit processor 105 submits the appropriate information to the credit approval authority 106 in a request for credit approval. The credit approval authority 106 will either approve or deny the credit approval request and provide the appropriate information to the credit processor 105. In another embodiment, the actual payment information is sent directly to the credit approval authority 106 for approval or denial of the credit request and then supplied directly back to the trusted third party. Once credit has been approved or denied, via the credit processor 105 or directly via the credit approval authority 106, an authorization approval or denial for the transaction will be sent to the retailer 101.

When the retailer 101 has determined the product is ready to ship, the retailer 101 will attach a shipping label to the parcel including a ship identification code and an optional identifier corresponding to a particular package. The trusted third party will be notified that a parcel is ready for pick-up by a shipping partner 107. The trusted third party will then push the ship identification code along with the actual shipping address information to the shipping partner 107. Once the parcel has been picked up from the retailer 101 by the shipping partner 107, the shipping partner 107 uses the ship identification code, to re-label the parcel with the actual shipping address. The parcel is then shipped to the address selected by the consumer during the transaction. The optional one-up package number allows for multiple parcels to be shipped for the same order.

In order to further secure privacy, the trusted third party will maintain unique identification numbers corresponding to each member-consumer/each member retailer 101 pair. This information will also be maintained by the member records server 103 in the member records database 104. By having unique identification numbers for each consumer/retailer 101 pair, no matter what information the various retailers 101 maintain about transactions performed on their site, that information will not compromise the individual identity of the consumer transacting with that retailer 101. Furthermore, since the identification number used in the inventive system is a transaction-specific identification number, that number will not be able to be used to determine the identity of the consumer participating in that transaction.

Consumer identification information, shipping address information, and payment method information is maintained in the member records database 104. Only the consumer and the trusted third party are ever given access to the information maintained in the member records database 104. As discussed above, the consumer is identified to the retailer 101 only through a consumer/retailer 101 specific identification number. As this number is different for every consumer/retailer 101 combination, it is impossible for retailers 101 to pool their information to decode the identity of the consumers using their sites. In one embodiment, a particular consumer has a unique identification number with respect to particular retailer 101, in this embodiment, the consumer may still benefit from retailer 101 sites that permit personalization since, for any particular retailer 101, a particular consumer can be uniquely identified. In another embodiment, the consumer/retailer 101 specific identification number is varied for each transaction at a retailer, thereby preventing any personalization for that retailer site, but also preventing any identification of a consumer of that site based on past transactions.

In the inventive system, a consumer may complete a transaction with a retailer 101 without that retailer 101 ever receiving a shipping address or a payment method from the consumer. Accordingly, a retailer 101 will not be able to determine the identity of consumers transacting with them. The other external party involved in transactions in the inventive system, namely, the shipping partner 107 will not have access to this information either. The shipping partner 107 merely receives address information to be matched up with the one-time use transaction identification code so that the package may be delivered to the address specified by the consumer during the transaction. It should be noted, that there is no limitation that the shipping address specified during the transaction be an address that is in any way associated with a consumer. For example, transactions may be performed using the system of the present invention for purchasing items that are delivered to parties other than the consumer.

Figure 2:
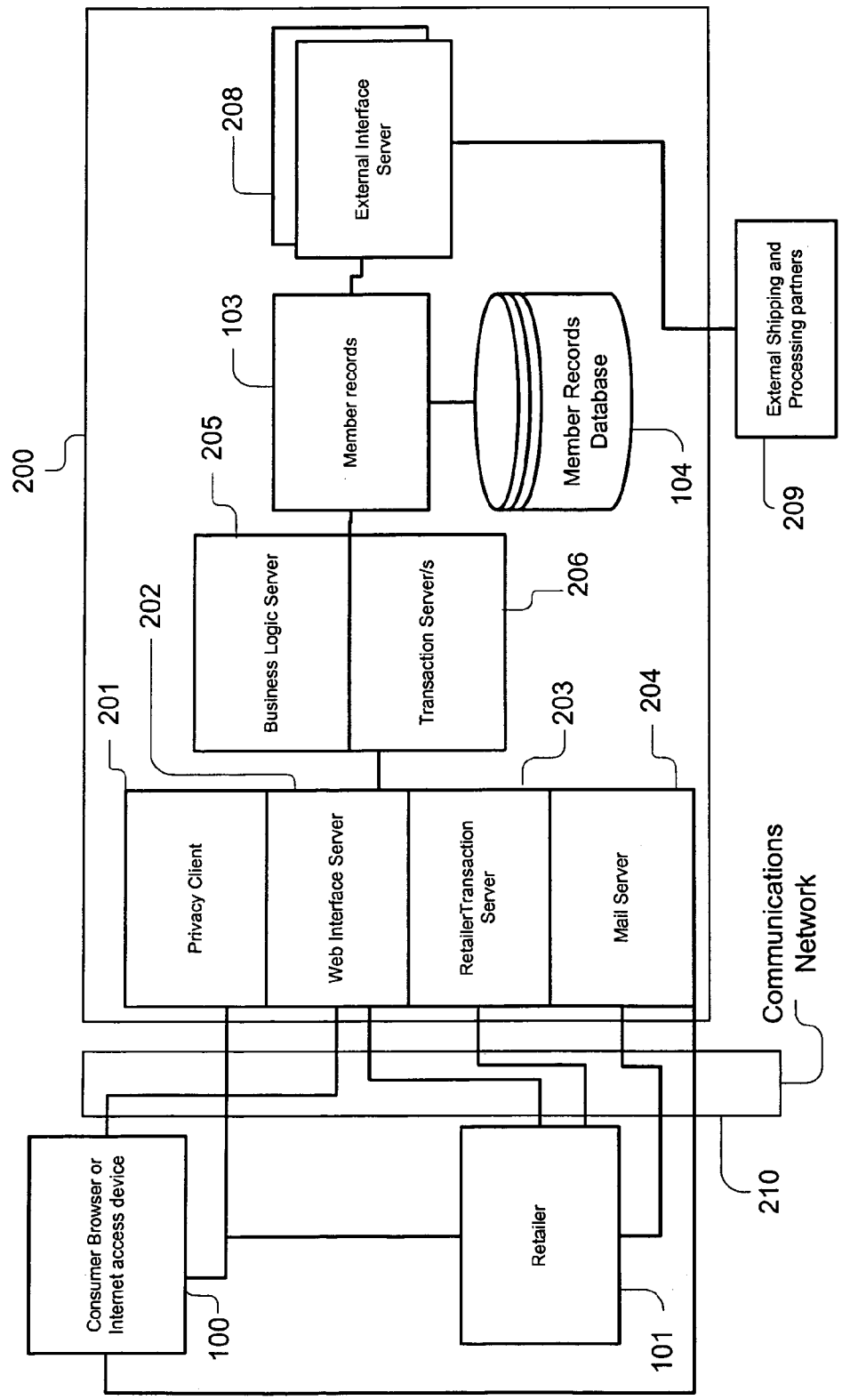
FIG. 2 is a block diagram showing the various system and software components in one embodiment of the present invention.

FIG. 2 shows the various software and system components of the present invention. As shown in FIG. 2, the system includes a set of functionality within protected and secure facilities of a trusted third party 200. In one embodiment, privacy client 201 software is downloaded by members to reside on the member's consumer access device 100. In another embodiment, the privacy client 201 is a server-based product downloaded on each use from the trusted third party's site. In yet another embodiment, the privacy client 201 software is provided to the consumer on physical media (e.g., compact disc, floppy disk, etc.) for installation onto the consumer access device 100. Further, additional external entities may interface with the trusted third party via a communications network 210. The communications network may, for example, be the Internet or other communications link such as a virtual private network, a wireless link, or other link, such as a direct external connection.

In one embodiment, the privacy client 201 is downloaded from the trusted third party's site upon registration of a new member. In another embodiment, the privacy client 201 is a server-based product downloaded for each use. The privacy client 201 provides functionality that enables participating retailer 101 software to recognize that a particular consumer is enabled (i.e., is a member). In one embodiment, the privacy client 201 software is automatically activated by the consumer activating the checkout functionality of the member retailer's 101 site. In another embodiment, the privacy client 201 software is activated by selecting a particular button placed on the member retailer's 101 site. In both embodiments described above, the retailer 101 will include an activation mechanism on their web site.

The privacy client 201 software is the interface to the consumer at the time of purchase or login to a retailer 101. Personal data relating to the consumer is not stored locally on the consumer access device 101. Rather, data is retrieved via the member records server 103 from the member records database 104 after a member has successfully logged in. To log in, a consumer enters, for example, a user name, and pass phrase that uniquely identifies the consumer to the trusted third party. Other user verification methods may also be used, including, but not limited to digital certificates, shared secrets, and physical interrogation devices (e.g., number generators, smart cards, dongles, etc).

The web interface server 202 provides the interface to the trusted third party's systems. In one embodiment, the web interface server 202 provides an interactive interface to the privacy client 201 and provides the top level security mechanisms for secure transmission of data between the trusted third party client, the browser running on the consumer access device 100, and the retailer 101. The web interface server 202 within the trusted third party system provides a central distribution point for web pages requested by clients and generated by the business logic servers 205, which are fed by the member records database 104.

The retailer transaction server 203 provides the transactional interface to the retailer 101 community. The retailer transaction server 203 is a specialized interface to the communications network 210 which accepts transactional input and generates transactional output to interface with the retailer's 101 processing software. Payment transactions between the trusted third party and the retailer 101 (e.g., authorizations, payments, credits, etc.) are handled by the retailer transaction server 203.

The business logic server 205 provides the focus of the trusted third party's internal system: it supports the business rules which bridge between the web interface server 202 and the member records server 103. The business logic server 205 processing includes, for example, user authentication, fraud management, authorization process, checkout page formatting, e-mail reformatting, customer service queries and support, credit processing transactions, and security processing.

The internal transaction server 206, internal to the trusted third party provides the "glue" which ties all of the pieces of the trusted third party's system together. The internal transaction server 206 routes the internal messages between the business logic servers 205, the member records server 103, the member records database 104, and the web interface servers 202.

The member records server 103 provides processing and security functionality for the member records database 104.

The member records database 104 information about all registered consumers, including, but not limited to their name, address information, contact information, credit card numbers, billing addresses, shipping addresses, past transactions, shipment tracking information, and fraud tracking information. Furthermore, the member records database 104 will also maintain information pertaining to a member's retailer 101 associations. For example, the member records database will include contact information, preferred checkout format information, transaction records, shipping manifests, and fraud management information.

The information maintained in the member records database 104 is separated into two parts, a normal-security information set and a high-security information set. Information within the member records database 104 categorized as high-security information includes, for example, credit card numbers, fraud tracking information, etc. High-security information will be housed in a database server deep in the trusted third party's protected server vault. Additional protections will be applied to this category of data, such as, for example, encryption of the contents.

The trusted third party will interface with shipping partners 107 and credit card processing partners. Connectivity to these external entities will be via secure links, including, but not limited to, dedicated links or virtual private networks on the Internet. The interface to the credit processing partner will follow guidelines and protocols established across the financial industry. The interface to the shipping partner 107 will use, for example, the file transfer protocol (FTP), or other protocol, to forward electronic manifest information to the shipping partner 107. The manifest information will allow for translation of the anonymous shipping information into the actual destination address.

The present invention uses web servers to communicate through the Internet between the trusted third party and the member-consumers. Front-end processors include transactional processing machines for interfacing between the trusted third party and the retailer 101 community. Application servers are used to implement the business logic on the business logic servers 205 which control and drive the trusted third party's service. These application servers implement the rules which fully describe the trusted third party and its business through software logic. The application servers are used to control the flow of information to the member records database 104 and to reformat relational data in the member records databases 104 into a format for display by the web interface servers 202. Since the trusted third party system includes many firewalls within its system, messages will be used to move data to and from different machines which make up the trusted third party's system. In one embodiment, messages will also be used to move data from the application servers to the web servers where standard browser interfaces are used to communicate to the member-consumers. In another embodiment, proprietary client software is used to enhance the security and functionality of the standard client browser.

The mail server 204 provides for communication between the retailers 101 and consumers. E-mail messages are addressed via the unique identifier corresponding to the retailer 101/consumer pair, and are forwarded to the mail server 204 of the trusted third party. The trusted third party accesses the targeted consumer's e-mail forwarded preferences via the member records server 103 from the member records database 104. If forwarding is indicated, the e-mail is reformatted and addressed with the consumer's e-mail address. The e-mail is then forwarded to the consumer using the mail server 204.

FIG. 3A shows a structure of one example of a record containing information for identifying a consumer to an retailer 101. As shown in FIG. 3A, the record includes a retailer identification field 1000, and a consumer identification field 1001. The consumer identification field 1001 is for each retailer 101 and only the retailer identification field 1000 combined with the consumer identification field 1001 will uniquely identify an individual member. Unlike many conventional third party schemes to provide anonymity, the present invention provides both a method for retailers 101 to track a particular consumer's behavior at their location, while providing additional protection for the consumer by preventing retailers 101 from sharing consumer identification information.

FIG. 3B shows a structure of one example of a record containing information pertaining to a purchase transaction between a consumer and an retailer 101. As shown in FIG. 3B, the record includes a retailer identification field 1010, a consumer identification field 1011, an order identification field 1012, a payment identification field 1013, and a ship location identification field 1014. This record includes the information that is provided to the retailer 101 by the consumer to complete a private online transaction. This information, along with the financial details of a transaction, uniquely identify everything necessary to purchase, pay, and then ship an item from a retailer to a consumer with complete anonymity. A transaction therefore has all of these elements. This record format can be used by the trusted third party to gather the necessary information from the retailer 101. The trusted third party only has to generate the information for the associated order identification field 1012 and pass that to the retailer via the consumer browser. Once the order identification field 1012 has been provided, the record is complete since the retailer 101 will already have their own retailer identification 1010 and the consumer identification 1011 available. These three pieces of information are sufficient to uniquely identify a purchase transaction made with the inventive system. The transmission of the payment identification 1013 and ship location identification 1014 can be accomplished, for example, by the consumer browser transmitting them to the trusted third party, or, by passing them on to the retailer 101, which may, in turn, pass them to the trusted third party. Neither approach will jeopardize the anonymity of the consumer. In one embodiment of the present invention, a unique transaction identification is generated for each transaction in order to easily identify each particular transaction. Coupled with the record format described above relating to FIG. 3B, the transaction identification is a powerful tool for further identifying transaction information.

FIG. 3C shows exemplary structures of records containing a transaction identification field 1020 for uniquely identifying a purchase transaction between a consumer and an retailer 101. Since the transaction identification field 1020 uniquely identifies a transaction, the trusted third party has increased flexibility for designing interfaces between the trusted third party and a variety of retailers 101.

FIG. 3D shows exemplary structures of records containing a transaction identification field 1023, a consumer identification field 1024, a payment identification field 1025, and a ship location identification field 1026 for uniquely identifying a purchase transaction between a consumer and an retailer 101. This record format can be used to transmit transaction information to the trusted third party by the consumer access device 100. Use of this data structure in conjunction with a record format such as that described regarding FIG. 3C, provides increased flexibility in designing interfaces to a variety of retailers.

Figure 4A:
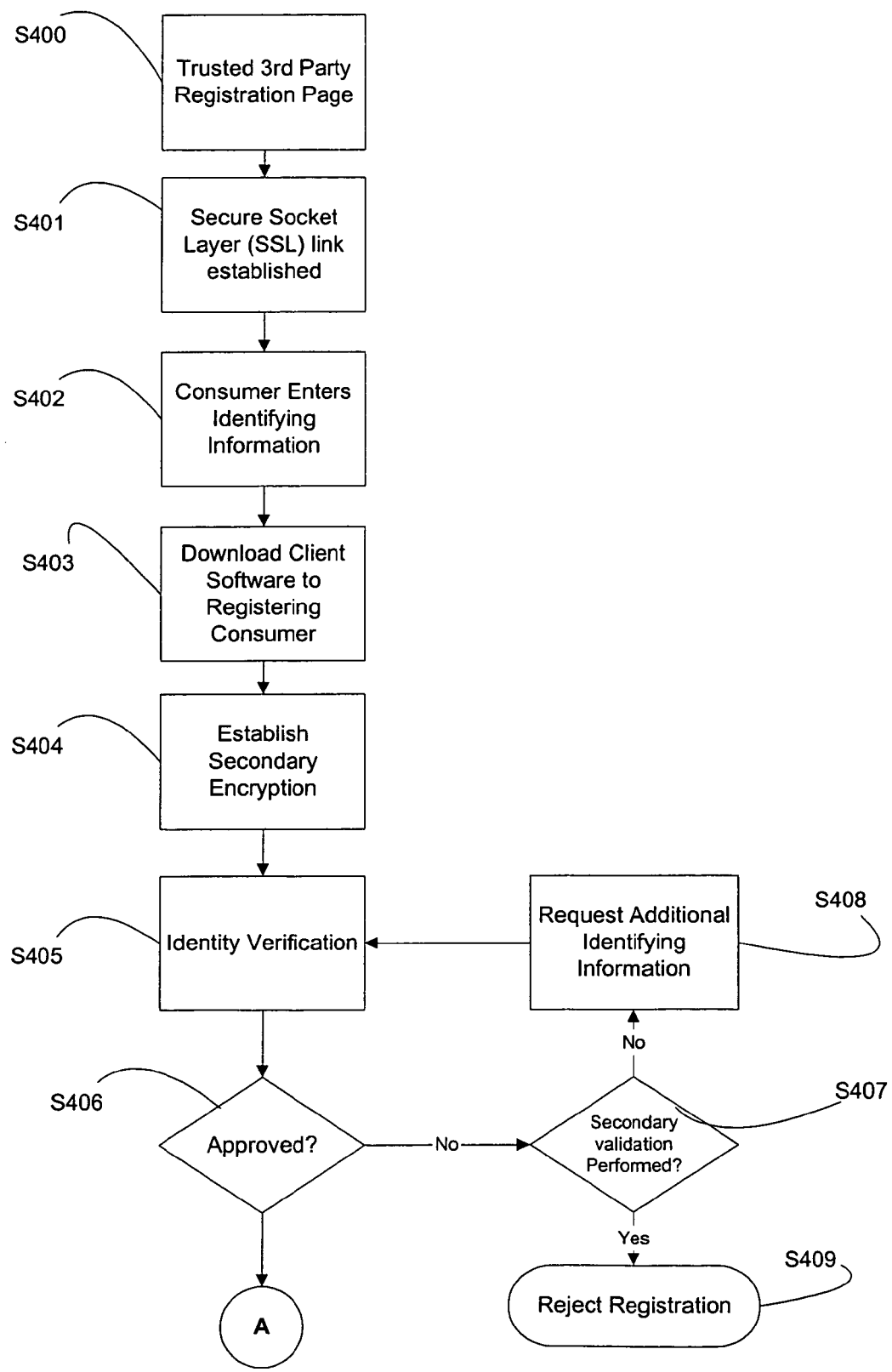
FIGS. 4A and 4B are a flow diagram of one embodiment of a consumer registration process according to the present invention.
Figure 4B:
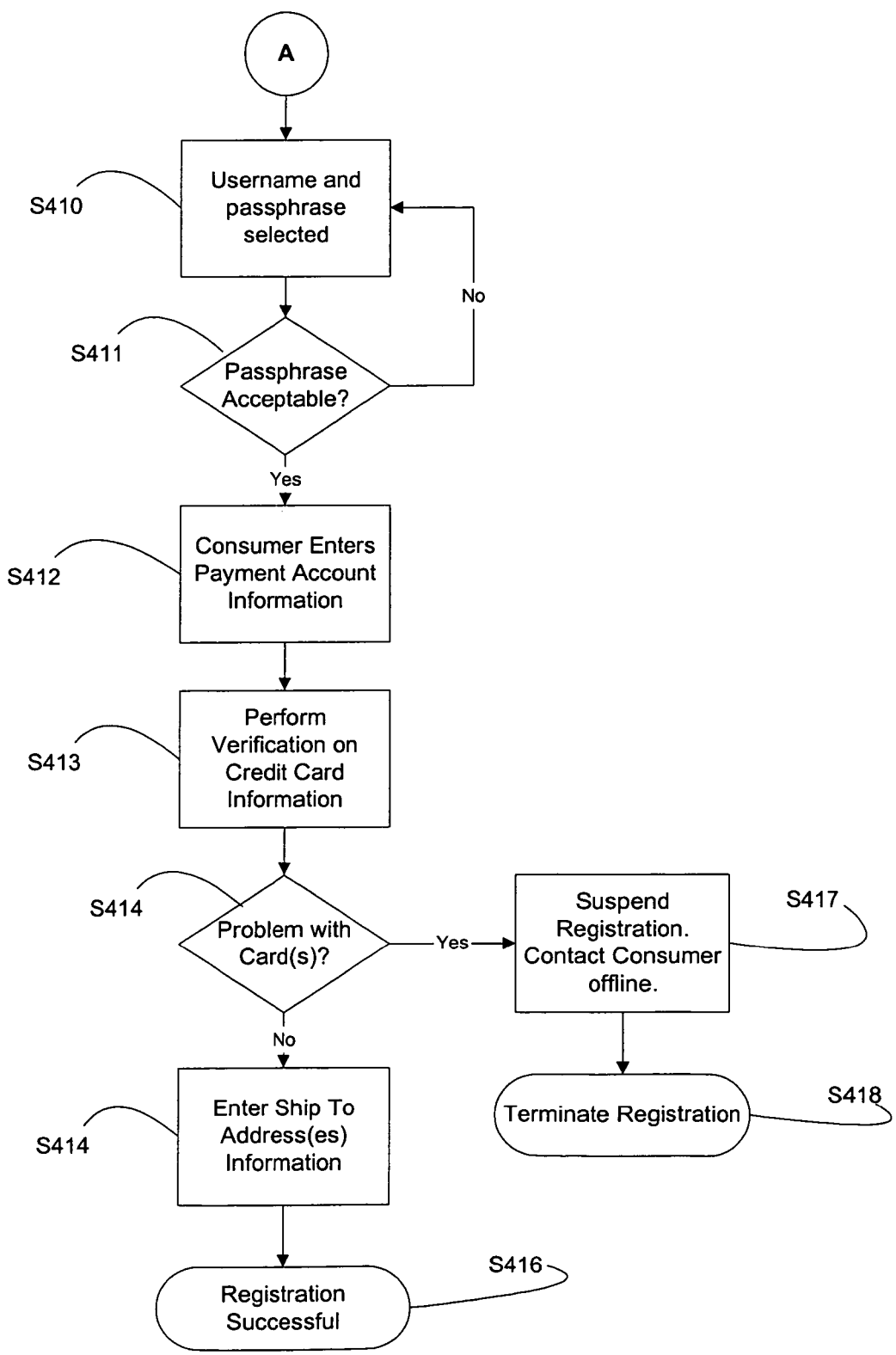

FIGS. 4A and 4B show a process through which a consumer registers for membership with the trusted third party according to one embodiment of the present invention. Consumers must first register with the trusted third party prior to using the purchase privacy protection service. FIGS. 4A and 4B outline the registration process according to one embodiment. As shown in FIG. 4A, the process begins with step S400 where the consumer enters the registration process at the trusted third party's site. Immediately upon entering the trusted third party's registration site, the process proceeds to step S401 where the consumer's browser operating on the consumer access device 100 and the trusted third party's web interface server 202 will establish a secure socket layer (SSL) connection. The SSL connection allows for the secure transfer of information between the consumer and the trusted third party. After the SSL link has been established, the process proceeds to step S402 where the consumer will enter identification information including, but not limited to, the consumer's name, mailing address, and contact information.

After the consumer has entered their identifying information, the process proceeds to step S403 where the privacy client 201 software is downloaded from the trusted third party's site to the consumer's browser running on the consumer access device 100. The privacy client 201 software is, in one embodiment, a "plug-in." Once the plug-in is loaded on the consumer access device 100, the process proceeds to step S404 where secondary encryption is established. From this point forward, all information sent between the trusted third party and the consumer is, as an option, encrypted in addition to it being transferred over the secure SSL link. The encryption process doubly-wraps the consumer's sensitive data for additional protection against ease dropping on the link.

Once the encryption process has been established, the process proceeds to step S405 where the trusted third party performs user verification. The process then proceeds to step S406 where it is determined whether the consumer's identity has been verified. If the consumer's identity has not been verified (i.e., "No" at step S406) the process proceeds to step S407 where it is determined whether a secondary validation has already been performed. If it is determined that a secondary validation has not already been performed (i.e., "No" at step S407), the process proceeds to step S408 where additional identifying information is requested from the consumer. After receiving additional identifying information from the consumer, the process proceeds to step S405 where, again, the consumer's identity is verified. If on the other hand it is determined that secondary validation had already been performed (i.e., "Yes" at step S407), the process proceeds to step S409 where membership registration is rejected for that consumer.

If it is determined that the consumer's identity has been verified (i.e., "Yes" at step S406), the process proceeds to step S410, shown in FIG. 4B. As shown in FIG. 4B, the consumer is prompted to enter a user name and pass phrase as step S410. The process then proceeds to step S411 where it is determined whether the user name and pass phrase is acceptable. If it is determined that the user name and pass phrase is not acceptable (i.e., "No" at step S411), the process returns to step S410, where, again, the consumer is prompted to enter a user name and pass phrase. If, however, it is determined that the user name and pass phrase is acceptable (i.e., "Yes" at step S411), the process proceeds to step S412 where the consumer is prompted to enter payment information. In one embodiment, payment information includes, but is not limited to, credit card information, bank account information, alternative payment vehicles, or other personal payment methods. In one embodiment, the consumer is prompted to enter an anonymous identifier (e.g., a nickname, a unique code, or a one time use code) for each payment method entered. By providing an anonymous identifier for each payment method, reference to the methods may be made by using the anonymous identifier, rather than the actual information pertaining to the method itself (e.g., credit card number, etc.). In another embodiment, the anonymous identifier is assigned by the trusted third party.

Once the consumer has entered payment account information, the process proceeds to step S413 where verification on the account information is performed by the trusted third party. The process then proceeds to step S414 where it is determined whether there are any problems with the account information entered. If it is determined that there are problems with the account information entered (i.e., "Yes" at step S414), the process proceeds to step S417 where registration is suspended and the consumer is contacted off line. If it is determined that the information that had been entered is for a known fraudulent account, the process proceeds to step S418 where membership registration is terminated. If, however, it is determined that there are no problems with the account information entered (e.g., "No" at step S414), the process proceeds to step S415 where the consumer is prompted to enter shipping address information. Again, as with the payment information, in one embodiment the consumer is prompted to enter an anonymous identifier for each shipping address. In another embodiment, the anonymous identifiers for the shipping addresses are assigned by the trusted third party. Furthermore, the shipping addresses entered by the consumer are scanned for completeness and accuracy. The process then proceeds to step S416 where membership registration is deemed successful.

Figure 5A:
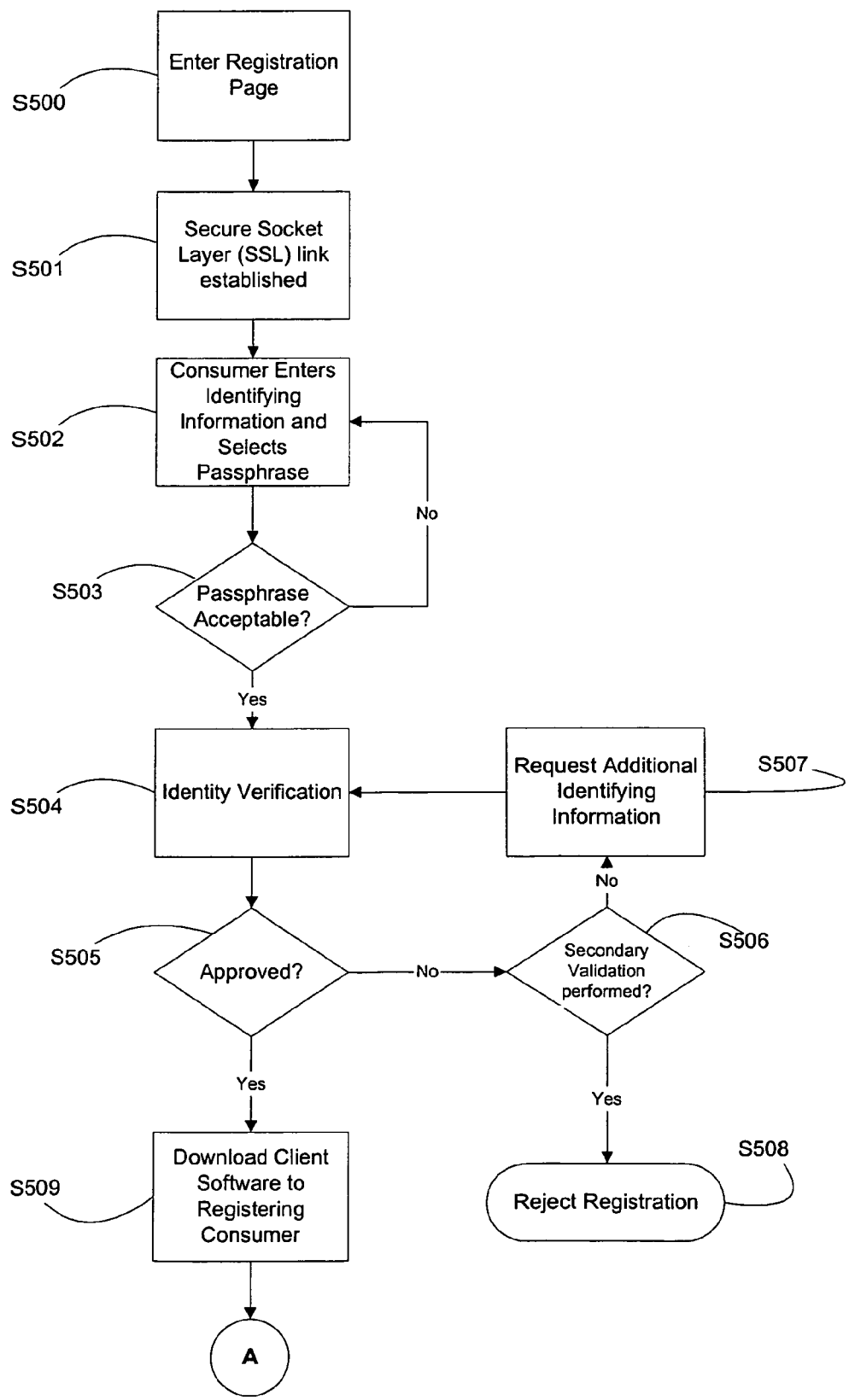
FIGS. 5A and 5B are a flow diagram of another embodiment of a consumer registration process according to the present invention.
Figure 5B:
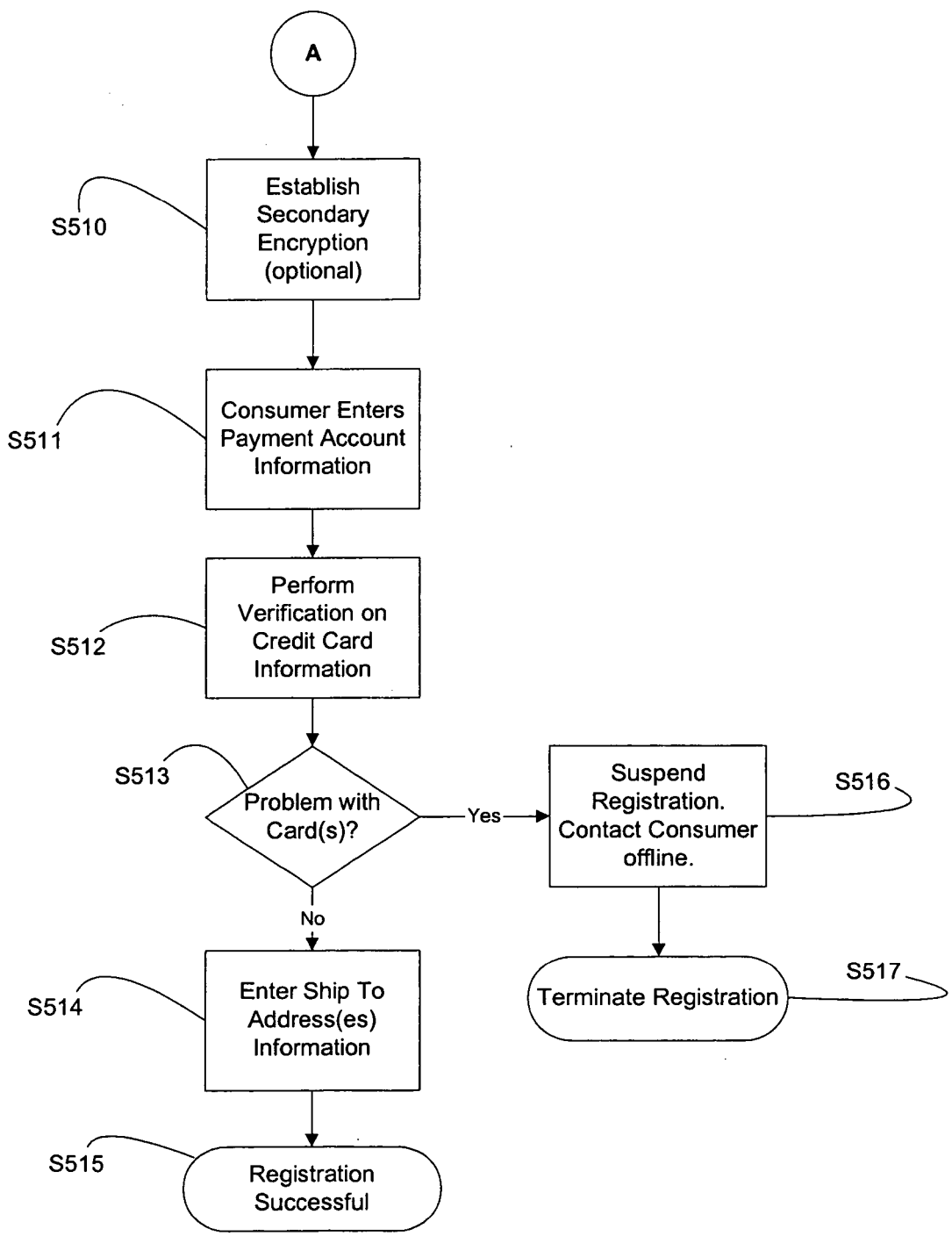

FIGS. 5A and 5B show a process through which a consumer registers for membership with the trusted third party according to another embodiment of the present invention. This embodiment differs from that presented in FIGS. 4A and 4B, in that the embodiment in FIGS. 5A and 5B require the consumer to undergo identity verification prior to downloading the trusted third party client software. FIGS. 5A and 5B outline the registration process according to one embodiment. As shown in FIG. 5A, the process begins with step S500 where the consumer enters the registration process at the trusted third party's site. Immediately upon entering the trusted third party's registration site, the process proceeds to step S501 where the consumer's browser operating on the consumer access device 100 and the trusted third party's web interface server 202 will establish a secure socket layer (SSL) connection. The SSL connection allows for the secure transfer of information between the consumer and the trusted third party. After the SSL link has been established, the process proceeds to step S502 where the consumer will enter identification information including, but not limited to, the consumer's name, mailing address, and contact information. The consumer will also select a username and pass phrase at this step.

The process then proceeds to step S503 where it is determined whether the user name and pass phrase is acceptable. If it is determined that the user name and pass phrase is not acceptable (i.e., "No" at step S503), the process returns to step S502, where, again, the consumer is prompted to enter a user name and pass phrase. If, however, it is determined that the user name and pass phrase is acceptable (i.e., "Yes" at step S503), the process proceeds to step S504 where the trusted third party performs user verification. The process then proceeds to step S505 where it is determined whether the consumer's identity has been verified. If the consumer's identity has not been verified (i.e., "No" at step S505) the process proceeds to step S506 where it is determined whether a secondary validation has already been performed. If it is determined that a secondary validation has not already been performed (i.e., "No" at step S506), the process proceeds to step S507 where additional identifying information is requested from the consumer. After receiving additional identifying information from the consumer, the process proceeds to step S504 where, again, the consumer's identity is verified. If on the other hand it is determined that secondary validation had already been performed (i.e., "Yes" at step S506), the process proceeds to step S508 where membership registration is rejected for that consumer.

After the consumer has entered their identifying information, the process proceeds to step S509 where the privacy client 201 software is downloaded from the trusted third party's site to the consumer's browser running on the consumer access device 100. The privacy client 201 software is, in one embodiment, a "plug-in." Once the plug-in is loaded on the consumer access device 100, the process proceeds to step S510 where secondary encryption is established. From this point forward, all information sent between the trusted third party and the consumer is, as an option, encrypted in addition to being sent via the secure SSL link. The encryption process doubly wraps the consumer's sensitive data for additional protection against ease dropping on the link.

Once secondary encryption has been established, the process proceeds to step S511 where the consumer is prompted to enter payment information. In one embodiment, payment information includes, but is not limited to, credit card information, bank account information, alternative payment vehicles, or other personal payment methods. In one embodiment the consumer is prompted to enter an anonymous identifier for each payment method entered. In another embodiment, the anonymous identifier is assigned by the trusted third party. By providing a anonymous identifier for each payment method, reference to the methods may be made by using the anonymous identifier, rather than the actual information pertaining to the method itself (e.g., credit card number, etc.).

Once the consumer has entered payment account information, the process proceeds to step S512 where verification on the account information is performed by the trusted third party. The process then proceeds to step S513 where it is determined whether there are any problems with the account information entered. If it is determined that there are problems with the account information entered (i.e., "Yes" at step S513), the process proceeds to step S516 where registration is suspended and the consumer is contacted off line. If it is determined that the information that had been entered is for a known fraudulent account, the process proceeds to step S517 where membership registration is terminated. If, however, it is determined that there are no problems with the account information entered (e.g., "No" at step S513), the process proceeds to step S514 where the consumer is prompted to enter shipping address information. Again, as with the payment information, in one embodiment, the consumer is prompted to enter an anonymous identifier for each shipping address. In another embodiment, the anonymous identifier is assigned by the trusted third party. Furthermore, the shipping addresses entered by the consumer are scanned for completeness. The process then proceeds to step S515 where membership registration is deemed successful.

Figure 6A:
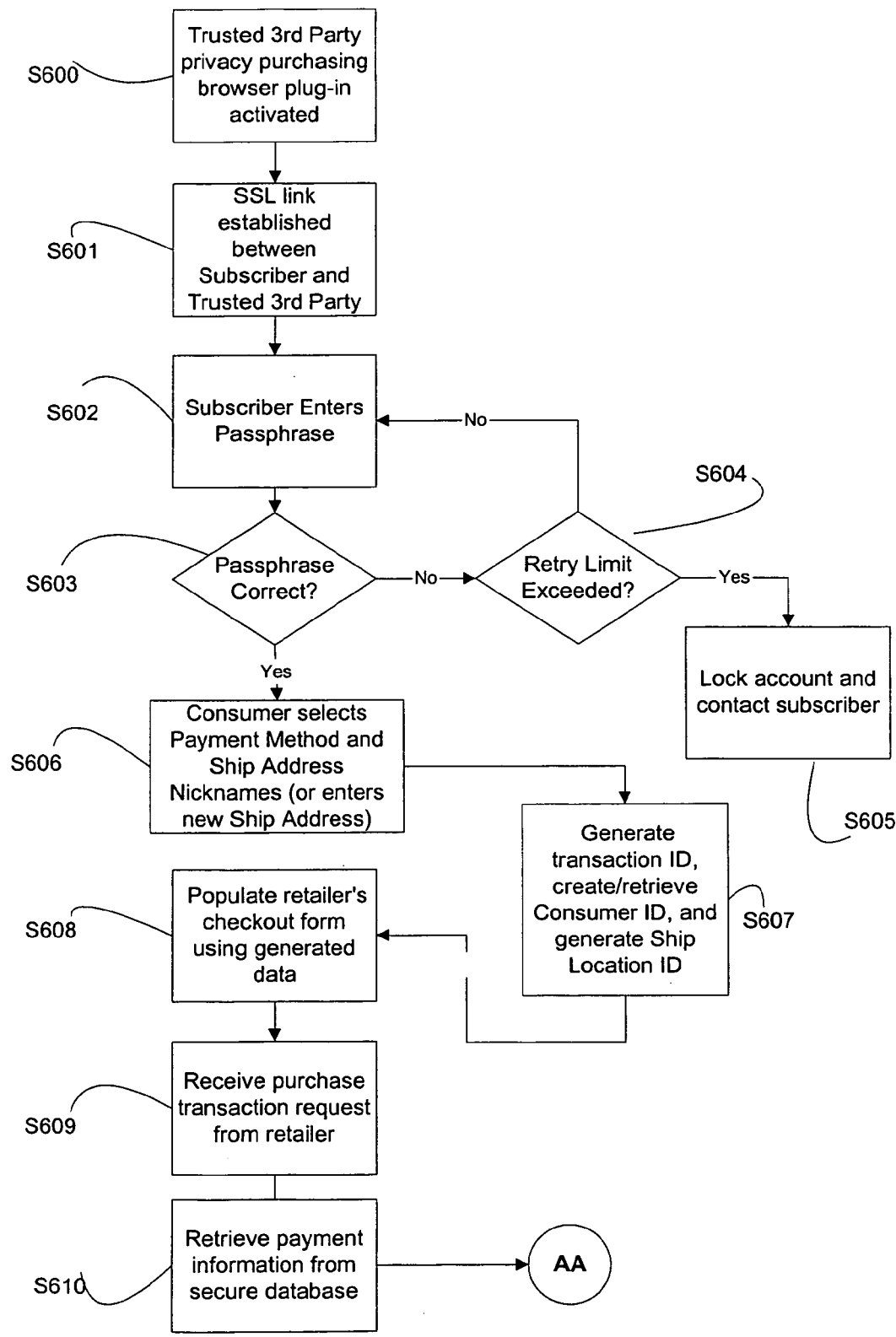
Figure 6B:
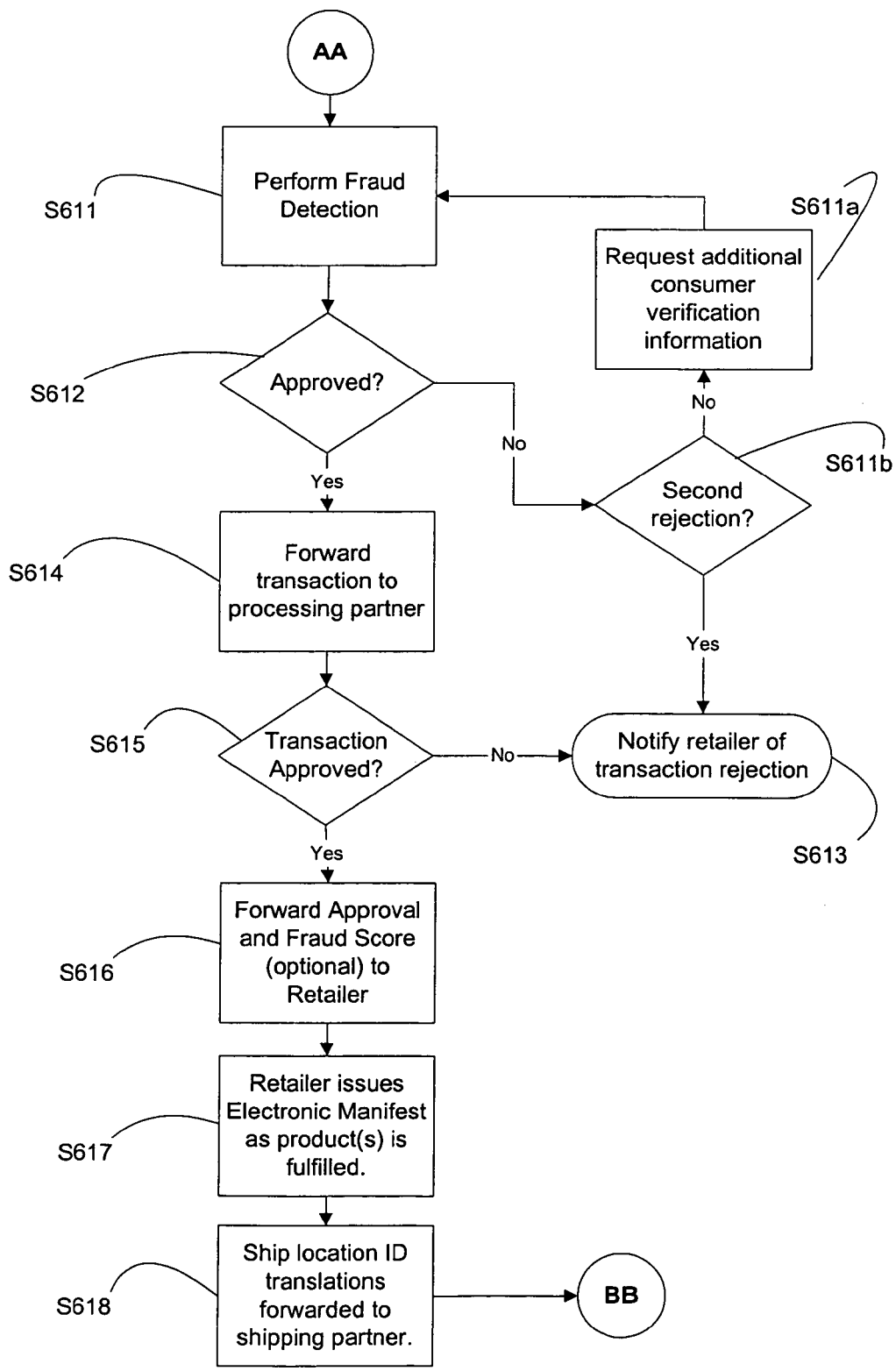

FIGS. 6A, 6B, and 6C show a purchase transaction process according to one embodiment of the present invention. As shown in FIG. 6A, the process step begins at step S600 when a member consumer visits a participating retailer and elects to checkout. Upon selecting to checkout, the privacy client 201 software operating on the consumer access device 100 will be activated. Once the privacy client 201 software is activated, the process proceeds to step S601 where an SSL link is established between the consumer and a web interface server 202 at one of the trusted third party's transaction processing facilities. In one embodiment, additional security is added for communication between the consumer's browser running on the consumer access device 100 and the trusted third party's transaction facilities by using encrypted envelopes. The encryption process uses the trusted third party's public keys for both the retailer transaction servers 203 and the member record database 104 to generate secure envelopes using standardized public key infrastructure (PKI) techniques.

After the SSL link has been established, the process proceeds to step S602 where the consumer is prompted to enter their user name and pass phrase. The process then proceeds to step S603 where it is determined whether the user name and pass phrase are correct. If it is determined that the user name and pass phrase are not correct (i.e., "No" at step S603), the process proceeds to step S604 where it is determined whether the retry limit has been exceeded. If the retry limit has not been exceeded (i.e., "No" at step S604), the process returns to S602 where the consumer can retry. If, however, it is determined that the retry limit has been exceeded (i.e., "Yes" at step S604), the process proceeds to step S605 where the consumer's account is locked and the consumer is contacted.

If it is determined that the consumer has entered a correct user name and pass phrase (i.e., "Yes" at step S603), the process proceeds to step S606 where the consumer is provided with an on-screen menu for selecting payment and shipping options. The payment and shipping options are provided to the consumer's privacy client via the web interface server 202 retrieving consumer selected anonymous identifiers from the member record database 104 via the trusted third party's internal transaction servers 206. The consumer will select the payment method and ship to address using the anonymous identifiers that were provided during the registration process, or, alternatively, through an account maintenance process. During this step in the process, the consumer is also provided with the option of adding new ship to addresses that can be saved for future use. At the conclusion of the step, the privacy client 201 software has completed its processing. In one embodiment, the privacy client 201 software remains active so as to receive status messages regarding the completion of the transaction, or, if additional verification information necessary, for completing the transaction.

Once the consumer has selected their payment method and ship to address, the process proceeds to step S607 where the trusted third party generates a transaction identification, a ship location identification, and either generates or retrieves the consumer identification for the retailer 101. Once this information has been generated by the trusted third party, the process proceeds to step S608 where the retailers 101 checkout page is populated with transactional data to allow the retailer 101 to internally process the transaction. The information provided to the retailer 101 does not contain any information revealing the consumer's identity or addresses, except for the consumer's city, state, and postal zip code, which have been provided for tax generation purposes as well as shipping cost purposes. Some retailers 101 will only require the postal zip code. The retailer 101 internally processes the transaction using the information received from the trusted third party.

Upon completing the internal processing, the process proceeds to step S609 where the retailer 101 forwards a transaction processing request to the trusted third party. The transaction processing request is in a mutually agreed upon format. Once received, the process proceeds to step S610 where the trusted third party retrieves payment information from the member records database 104 for processing. The process then proceeds to step S611, shown in FIG. 6B.

As shown in FIG. 6B, the trusted third party performs fraud detection at step S611 by calculating a fraud score. The process then proceeds to step S612 where it is determined whether the transaction has been approved based on the fraud detection. If the fraud score indicates a potential fraud (i.e., "No" at step S612), the process proceeds to step S611b where it is determined if additional consumer information has been requested. If it has (i.e. "Yes" at step S611b), the retailer 101 is notified of the rejection of the transaction. If additional information has not been previously requested for this transaction (i.e. "No" at step S611b), the process proceeds to step S611a where the additional information requests are forwarded to the consumer in step. Additional information requests may include, but are not limited to, credit card verification codes (CVC2, CCV2, etc.), registration question-answer pairs, etc. The transaction is then reevaluated for fraud with this additional information. If, however, it is determined at step S612 that the fraud score does not indicate a potential fraud (i.e., "Yes" at step S612), the process proceeds to step S614 where the transaction request is forwarded to the internal transaction server 206 appropriate for the selected payment method. For example, for credit card transactions, the transaction is forwarded to a credit card transaction gateway processor or directly to the credit granting institution. On the other hand, for internal micropayment and prefunded accounts, the trusted third party processes the transactions internally. The process then proceeds to step S615 where it is determined whether the transaction has been approved. In one embodiment, if the transaction has not been approved (i.e., "No" at step S615), the process proceeds to step S613 where the retailer 101 is notified of the rejection of the transaction. If, however, the transaction is approved (i.e., "Yes" at step S615), the process proceeds to step S616 where the approval is forwarded to the retailer 101. In another embodiment, if the transaction has been approved with a marginal fraud score, the process proceeds to step S616 where the approval is forwarded to the retailer 101, and the retailer 101 is notified of the fraud score. In this embodiment, the retailer 101 will determine acceptability of the transaction based on its internal business rules.

The retailer 101 is then free to complete transaction processing per its internal processes. The process then proceeds to step S617 where, upon fulfillment of the order, the retailer 101 forwards an electronic manifest to the trusted third party identifying the order and requesting settlement for the cost of the goods fulfilled. In the case of digital goods, the settlement will occur at the time of approval and the ship location identification is not used. The retailer 101 must include the ship location identification in bar code format on the package or packages. As discussed above, the ship location identification is a one-time use number. The process then proceeds to step S618 where the electronic manifest from the retailer 101 is used by the trusted third party to generate a detailed list of package identifications and package characteristics to forward to the shipping partner 107. The process then proceeds to step S619, shown in FIG. 6C.

As shown in FIG. 6C, at step S619, the shipping partner 107 receives the goods, determines the ship location identification, and translates the ship location identification to an actual shipping address. The shipping partner 107 then re-labels the package or packages with the actual shipping address and completes delivery. The shipping partner 107, in one embodiment, is the actual delivery service, whereas, in another embodiment, the shipping partner 107 is an intermediary/consolidator.

Figure 7A:
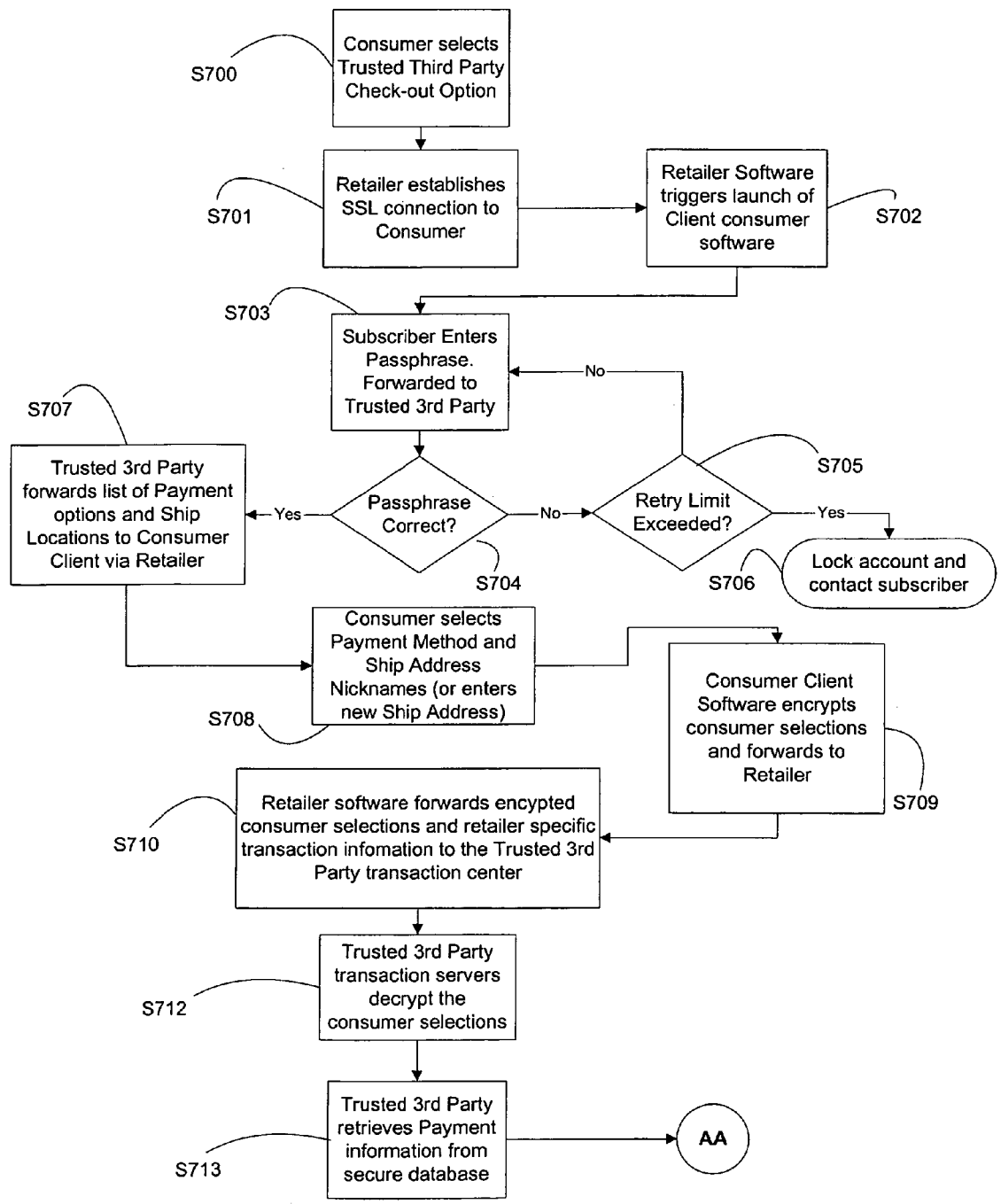
FIGS. 7A, 7B, and 7C are a flow diagram of another embodiment of a purchase transaction process according to the present invention.
Figure 7B:
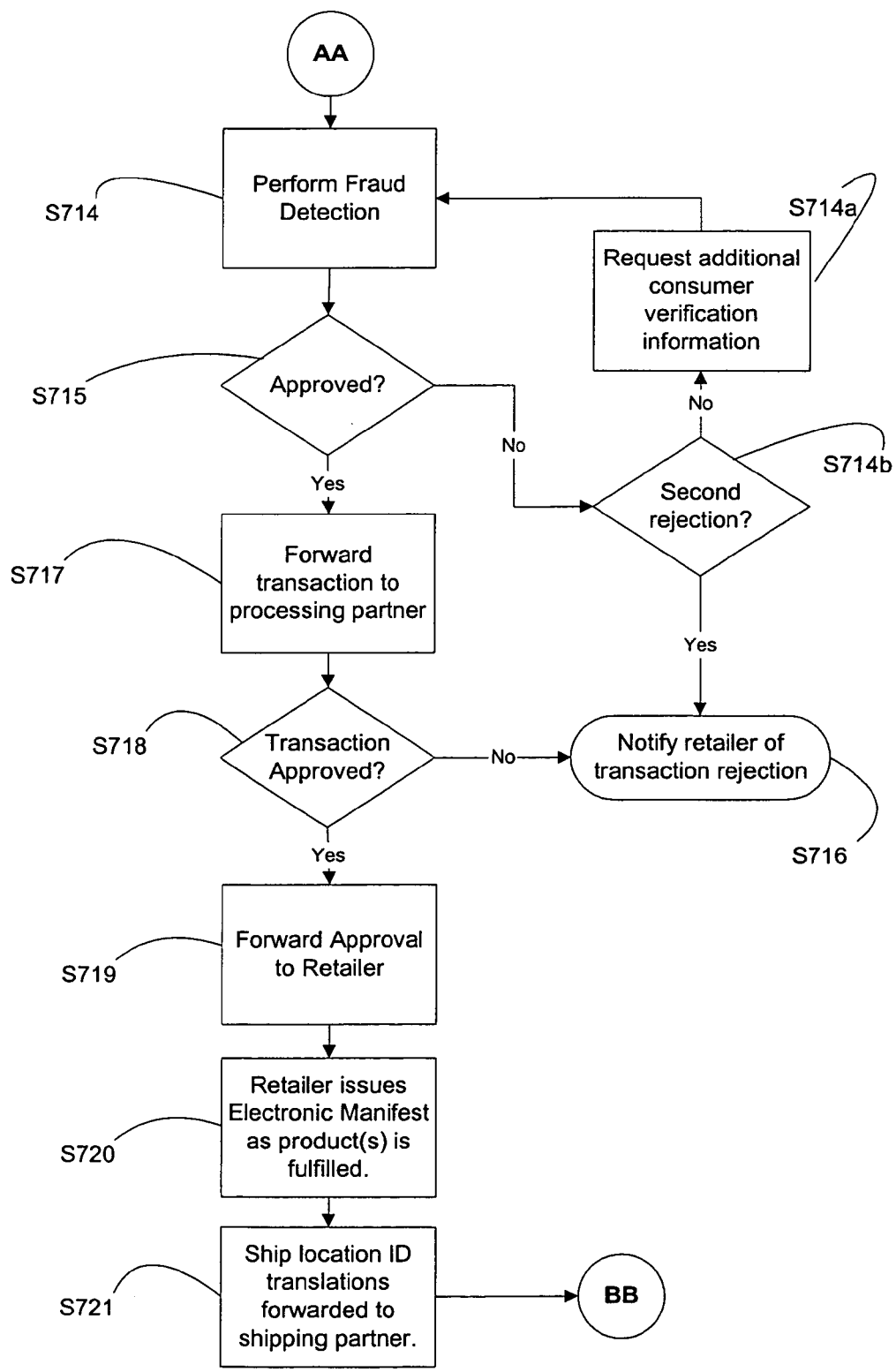
Figure 7C:
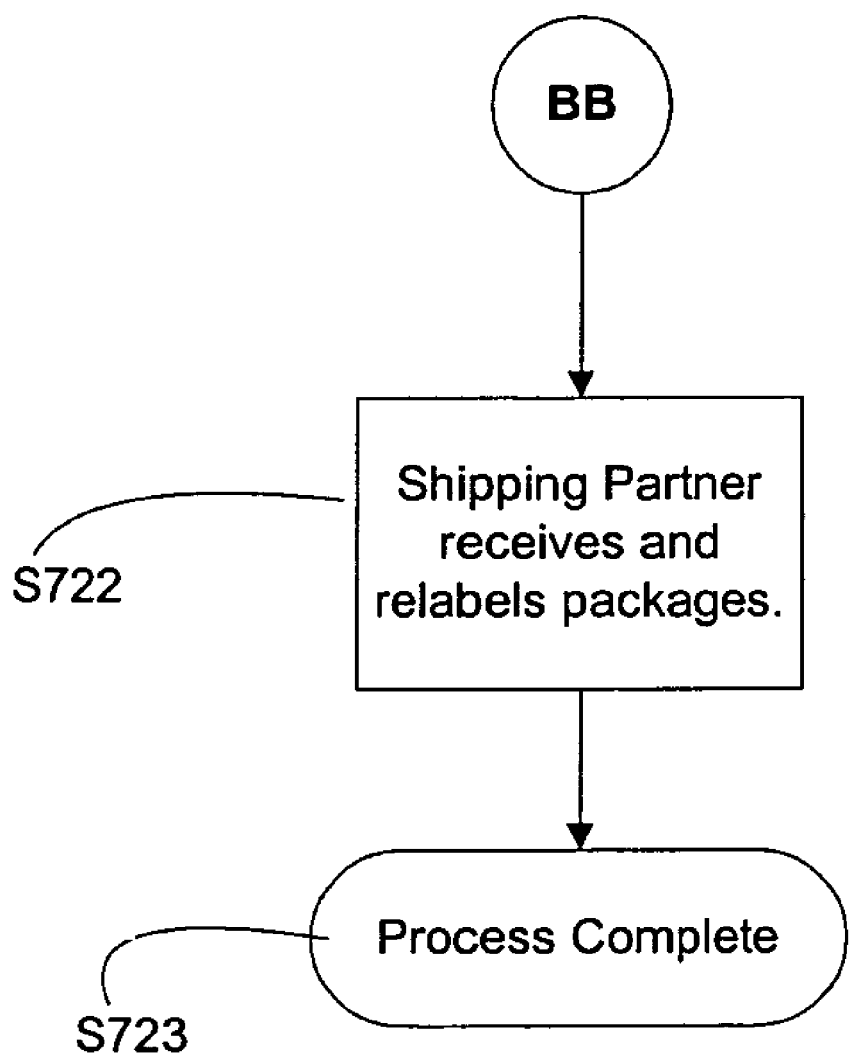

FIGS. 7A, 7B, and 7C show a purchase transaction process according to another embodiment of the present invention. This embodiment differs from that described in FIGS. 6A, 6B, and 6C, in that this embodiment uses trusted third party software modules at the retailer 101 processing center. As shown in FIG. 7A, the process step begins at step S700 when a member consumer visits a participating retailer and elects to checkout. Upon checking out by selecting a button corresponding to the trusted third party on the retailer 101 checkout page, the process proceeds to step S701 where the trusted third party software executing on the retailer 101 site will establish an SSL link, if it does not already exist, between the consumer and a web interface server 202 at one of the trusted third party's transaction processing facilities. In one embodiment, additional security is added for communication between the consumer's browser running on the consumer access device 100 and the trusted third party's transaction facilities by using encrypted envelopes. The encryption process uses the trusted third party's public key for the retailer transaction servers 203 and a proprietary database to generate secure envelopes using standardized public key infrastructure (PKI) techniques.

After the SSL link has been established, the process proceeds to step S702 where the trusted third party software executing on the retailer 101 site will trigger the trigger the trusted third party consumer software. The process then proceeds to step S702 where the consumer software prompts the consumer to enter their user name and pass phrase. The process then proceeds to step S704 where it is determined whether the user name and pass phrase entered by the consumer are correct. If it is determined that the user name and pass phrase are not correct (i.e., "No" at step S704), the process proceeds to step S705 where it is determined whether the retry limit has been exceeded. If the retry limit has not been exceeded (i.e., "No" at step S705), the process returns to S703 where the consumer can retry. If, however, it is determined that the retry limit has been exceeded (i.e., "Yes" at step S705), the process proceeds to step S706 where the consumer's account is locked and the consumer is contacted.

If it is determined that the consumer has entered a correct user name and pass phrase (i.e., "Yes" at step S704), the process proceeds to step S707 where the trusted third party will forward a list of payment method anonymous identifiers and ship-to address anonymous identifiers to the consumer plug-in via the retailer 101 plug-in. The process then proceeds to step S708 where the consumer is provided with an on-screen menu for selecting payment and shipping options. The consumer will select the payment method and ship to address using the anonymous identifiers that were provided during the registration process, or, alternatively, through an account maintenance process. During this step in the process, the consumer is also provided with the option of adding new ship to addresses that can be saved for future use.

Once the consumer has selected their payment method and ship to address, the process proceeds to step S709 where the privacy client 201 software encrypts the payment and ship-to anonymous identifier selections and forwards them to the trusted third party plug-in resident at the retailer 101. In one embodiment, at the conclusion of this step, the privacy client 201 software has completed its processing. In another embodiment, the privacy client 201 software remains active so as to receive status messages regarding the completion of the transaction, or, if additional verification information is necessary, for completing the transaction.

Upon receipt of the privacy client payment and ship-to anonymous identifier selections, optionally encrypted, the process proceeds to step S710 where the trusted third party plug-in at the retailer 101 attaches retailer-specific information, including, but not limited to, purchase price and an indicator as to whether the product purchased was delivered goods or digital goods, and then forwards that information to the trusted third party. In step S712, the trusted third party generates a transaction identification, a ship location identification, and either generates or retrieves the consumer identification for the retailer 101. Once this information has been generated by the trusted third party, the process proceeds to step S713 where the consumer's payment and ship information is retrieved from the member records database 104. At this time, in the case of delivered goods, the trusted third party forwards the city, state, and zip code of the destination address. The retailer 101 returns the transaction cost, including taxes and shipping costs to the trusted third party. The process then proceeds to step S714, shown in FIG. 7B.

At step S714, the trusted third party performs fraud scoring of the transaction. The process then proceeds to step S715 where it is determined whether the transaction has been approved based on the fraud detection. If the fraud score indicates a potential fraud (i.e., "No" at step S715), the process proceeds to step S714*b* where it is determined if additional consumer information has been requested. If it has (i.e., "Yes" at step S714*b*), the retailer 101 is notified of the rejection of the transaction in step S716. If additional information has not been previously requested for this transaction (i.e., "No" at step S714*b*), the additional information requests are forwarded to the consumer in step S714*a*. Additional information requested may include, but is not limited to, credit card verification codes (CVC2, CCV2, etc), registration question-answer pairs, etc. The transaction is re-evaluated for fraud with this additional information. If, however, it is determined that the fraud score does not indicate a potential fraud (i.e., "Yes" at step S715), the process proceeds to step S717 where the transaction request is forwarded to the internal transaction server 206 appropriate for the selected payment method. For example, for credit card transactions, the transaction is forwarded to a credit card transaction gateway processor or, alternatively, directly to the credit granting institution. On the other hand, for internal micropayments and prefunded accounts, the trusted third party processes the transactions internally. The process then proceeds to step S718 where it is determined whether the transaction has been approved. In one embodiment, if the transaction has not been approved (i.e., "No" at step S718), the process proceeds to step S716 where the retailer 101 is notified of the rejection of the transaction. If, however, the transaction is approved (i.e., "Yes" at step S718), the process proceeds to step S719 where the approval is forwarded to the retailer 101. In another embodiment, if the transaction has been approved with a marginal fraud score, the process proceeds to step S719 where the retailer 101 is notified of the fraud score and the credit approval. In this embodiment, the retailer 101 will determine acceptability of the transaction based on its internal business rules. Additionally in step S719, the trusted third party forwards transaction information, for example, the transaction identification, consumer identification, ship location identification, to the retailer 101 for transaction processing.

The process then proceeds to step S720 where, upon fulfillment of the order, the retailer 101 forwards an electronic manifest to the trusted third party identifying the order and requesting settlement for the cost of the goods fulfilled. In the case of digital goods, the settlement will occur at the time of approval and the ship location identification is not used. The retailer 101 must include the ship location identification in bar code format on the package or packages. As discussed above, the ship location identification is a one-time use number. The process then proceeds to step S721 where the electronic manifest from the retailer 101 is used by the trusted third party to generate a detailed list of package identifications and package characteristics to forward to the shipping partner 107. The process then proceeds to step S722, shown in FIG. 7C.

As shown in FIG. 7C, at step S722, the shipping partner 107 receives the goods, determines the ship location identification, and translates the ship location identification to an actual shipping address. The shipping partner 107 then relabels the package or packages with the actual shipping address and completes delivery. The shipping partner 107, in one embodiment, is the actual delivery service, whereas, in another embodiment, the shipping partner 107 is an intermediary/consolidator.

Figure 8:
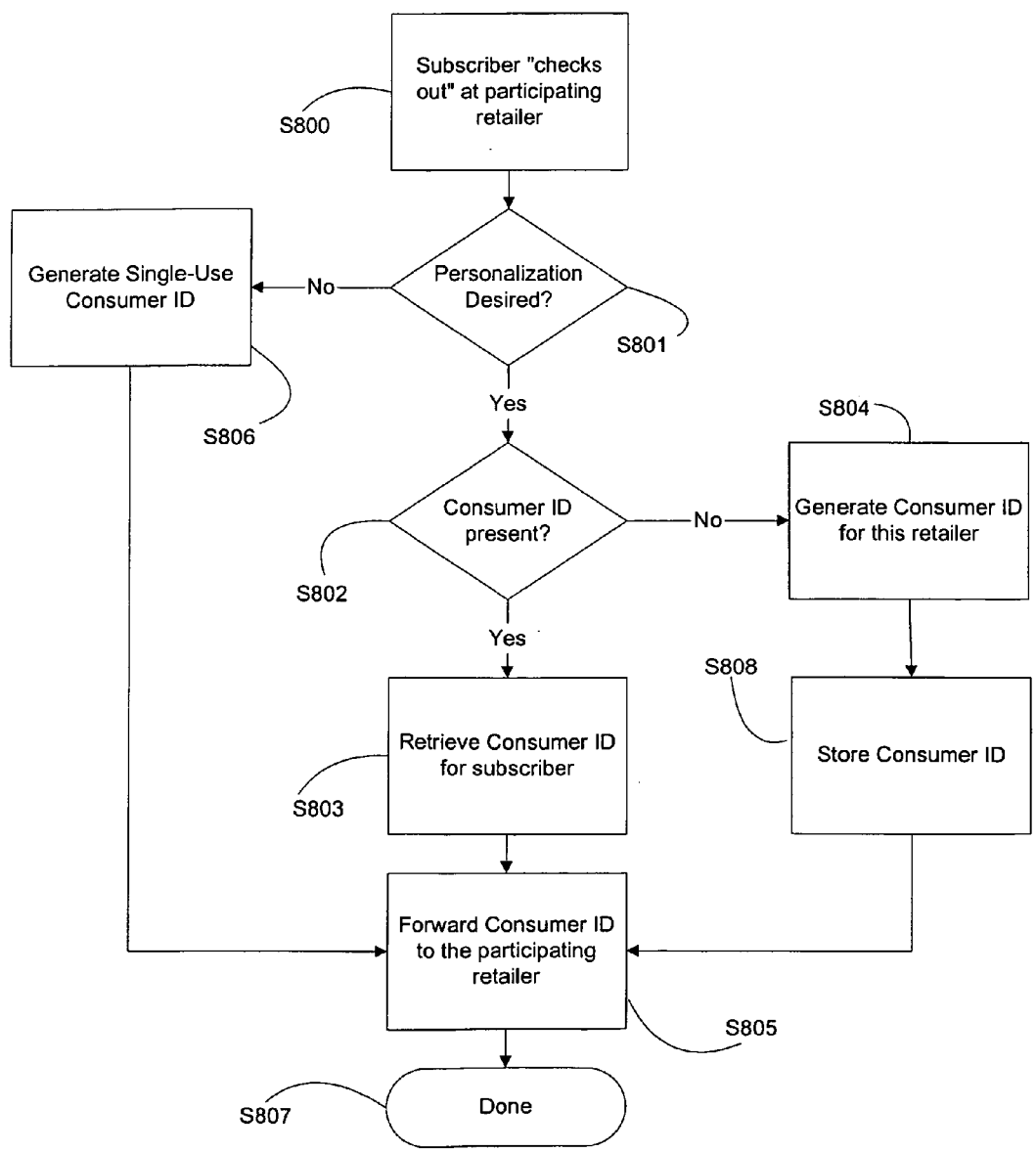
FIG. 8 is a flow diagram of a process for generating a consumer/retailer identification for one embodiment of the present invention.

FIG. 8 shows a process through which a consumer/retailer identification pair is determined according to one embodiment of the present invention. As shown in FIG. 8, the process begins at step S800 where a current member-consumer checks out on a web site of a participating retailer 101 using the trusted third party's privacy client 201 software. The process then proceeds to step S801 where it is determined whether the consumer desires to have personalization at the retailer 101 site. If it is determined that the consumer desires personalization with this particular retailer 101 (i.e., "Yes" at step S801), the process proceeds to step S802 where it is determined whether this consumer has previously selected to have personalization turned on at this retailer 101. If this consumer has previously selected to have personalization turned on at this retailer 101 (i.e., "Yes" at step S802), the process proceeds to step S803 where the retailer ID for this particular consumer is retrieved from the member records database 104. If it is determined that this consumer has not previously selected to have personalization turned on at this particular retailer 101 (i.e., "No" at step S802), the process proceeds to step S804 where a unique retailer ID for this retailer 101/consumer pair will be generated. In step S808a generated consumer identification indicator is stored for this retailer in the member records database 104.

If it is determined that the consumer does not wish to have personalization at this retailer 101 (i.e., "No" at step S801), the process proceeds to step S806 where a single-use identification for this retailer 101/consumer pair is generated. Once the retailer 101/consumer pair identification exists (either generated at step S806 or S804, or retrieved at step S803), the retailer 101/consumer identification is forward to the participating retailer 101 at step S805.

Figure 9:
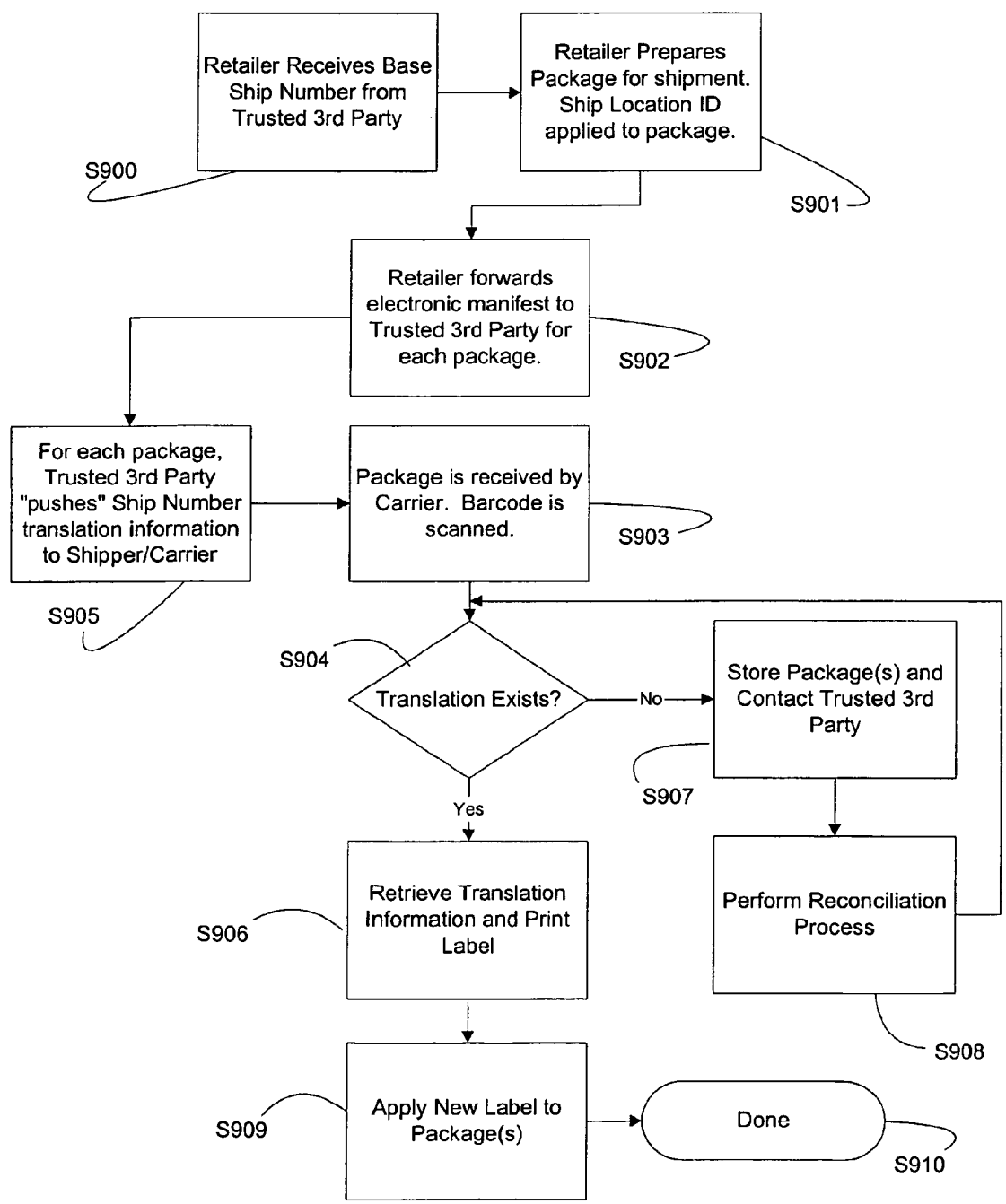
FIG. 9 is a flow diagram of a process for anonymous shipping for one embodiment of the present invention.

FIG. 9 shows a process through which anonymous shipping is performed in one embodiment of the present invention. As shown in FIG. 9, the process begins at step S900 wherein retailer 101 receives a one-use unique ship number from the trusted third party. The process then proceeds to step S901 where the retailer 101 prepares a parcel for shipment. For multiple packages in a particular order, the unique one-use ship number is concatenated with a "one up" package number to uniquely identify each parcel included in the order. The process then proceeds to step S902 where the retailer 101 forwards an electronic manifest to the trusted third party for each individual parcel. At step S905, the trusted third party pushes ship number translation information to the shipping partner 107. At step S903, the shipping partner 107 receives the encoded package from the retailer 101. Upon receiving the encoded package, the shipping partner 107 scans the bar code on each parcel. The process then proceeds to step S904 where it is determined if a translation exists between the ship number and the actual shipping address. If it is determined that a translation does exist (i.e., "Yes" at step S904), the process proceeds to step S906 where the translation information is retrieved by the shipping partner 107 and a label, including the actual shipping address, is printed. If it is determined that no translation exists (i.e., "No" at step S904), the process proceeds to step S907 where the shipping partner 107 will store the package and contact the trusted third party. The process will then proceed to step S908 where the trusted third party and the shipping partner 107 will work together in performing a reconciliation process. The process then returns to step S904. Once the labels have been printed at step S906 the process proceeds to step S909 where the new labels are applied to the individual parcels by the shipping partner 107.

FIG. 10 illustrates a computer system 1001 upon which an embodiment of the present invention may be implemented. The computer system 1001 includes a bus 1002 or other communication mechanism for communicating information, and a processor 1003 coupled with the bus 1002 for processing the information. The computer system 1001 also includes a main memory 1004, such as a random access memory (RAM) or other dynamic storage device (e.g., dynamic RAM (DRAM), static RAM (SRAM), and synchronous DRAM (SDRAM)), coupled to the bus 1002 for storing information and instructions to be executed by processor 1003. In addition, the main memory 1004 may be used for storing temporary variables or other intermediate information during the execution of instructions by the processor 1003. The computer system 1001 further includes a read only memory (ROM) 1005 or other static storage device (e.g., programmable ROM (PROM), erasable PROM (EPROM), and electrically erasable PROM (EEPROM)) coupled to the bus 1002 for storing static information and instructions for the processor 1003.

The computer system 1001 also includes a disk controller 1006 coupled to the bus 1002 to control one or more storage devices for storing information and instructions, such as a magnetic hard disk 1007, and a removable media drive 1008 (e.g., floppy disk drive, read-only compact disc drive, read/write compact disc drive, compact disc jukebox, tape drive, and removable magneto-optical drive). The storage devices may be added to the computer system 1001 using an appropriate device interface (e.g., small computer system interface (SCSI), integrated device electronics (IDE), enhanced-IDE (E-IDE), direct memory access (DMA), or ultra-DMA).

The computer system 1001 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1001 may also include a display controller 1009 coupled to the bus 1002 to control a display 1010, such as a cathode ray tube (CRT), for displaying information to a computer user. The computer system includes input devices, such as a keyboard 1011 and a pointing device 1012, for interacting with a computer user and providing information to the processor 1003. The pointing device 1012, for example, may be a mouse, a trackball, or a pointing stick for communicating direction information and command selections to the processor 1003 and for controlling cursor movement on the display 1010. In addition, a printer may provide printed listings of the data structures/information shown in FIGS. 3 and 4, or any other data stored and/or generated by the computer system 1001.

The computer system 1001 performs a portion or all of the processing steps of the invention in response to the processor 1003 executing one or more sequences of one or more instructions contained in a memory, such as the main memory 1004. Such instructions may be read into the main memory 1004 from another computer readable medium, such as a hard disk 1007 or a removable media drive 1008. One or more processors in a multi-processing arrangement may also be employed to execute the sequences of instructions contained in main memory 1004. In alternative embodiments, hard-wired circuitry may be used in place of or in combination with software instructions. Thus, embodiments are not limited to any specific combination of hardware circuitry and software.

As stated above, the computer system 1001 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1001, for driving a device or devices for implementing the invention, and for enabling the computer system 1001 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1003 for execution. A computer readable medium may take many forms, including but not limited to, non-volatile media, volatile media, and transmission media. Non-volatile media includes, for example, optical, magnetic disks, and magneto-optical disks, such as the hard disk 1007 or the removable media drive 1008. Volatile media includes dynamic memory, such as the main memory 1004. Transmission media includes coaxial cables, copper wire and fiber optics, including the wires that make up the bus 1002. Transmission media also may also take the form of acoustic or light waves, such as those generated during radio wave and infrared data communications.

Various forms of computer readable media may be involved in carrying out one or more sequences of one or more instructions to processor 1003 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1001 may receive the data on the telephone line and use an infrared transmitter to convert the data to an infrared signal. An infrared detector coupled to the bus 1002 can receive the data carried in the infrared signal and place the data on the bus 1002. The bus 1002 carries the data to the main memory 1004, from which the processor 1003 retrieves and executes the instructions. The instructions received by the main memory 1004 may optionally be stored on storage device 1007 or 1008 either before or after execution by processor 1003.

The computer system 1001 also includes a communication interface 1013 coupled to the bus 1002. The communication interface 1013 provides a two-way data communication coupling to a network link 1014 that is connected to, for example, a local area network (LAN) 1015, or to another communications network 1016 such as the Internet. For example, the communication interface 1013 may be a network interface card to attach to any packet switched LAN. As another example, the communication interface 1013 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1013 sends and receives electrical, electromagnetic or optical signals that carry digital data streams representing various types of information.

The network link 1014 typically provides data communication through one or more networks to other data devices. For example, the network link 1014 may provide a connection to a another computer through a local network 1015 (e.g., a LAN) or through equipment operated by a service provider, which provides communication services through a communications network 1016. In preferred embodiments, the local network 1014 and the communications network 1016 preferably use electrical, electromagnetic, or optical signals that carry digital data streams. The signals through the various networks and the signals on the network link 1014 and through the communication interface 1013, which carry the digital data to and from the computer system 1001, are exemplary forms of carrier waves transporting the information. The computer system 1001 can transmit and receive data, including program code, through the network(s) 1015 and 1016, the network link 1014 and the communication interface 1013. Moreover, the network link 1014 may provide a connection through a LAN 1015 to a mobile device 1017 such as a personal digital assistant (PDA) laptop computer, or cellular telephone. The LAN communications network 1015 and the communications network 1016 both use electrical, electromagnetic or optical signals that carry digital data streams. The signals through the various networks and the signals on the network link 1014 and through the communication interface 1013, which carry the digital data to and from the system 1001, are exemplary forms of carrier waves transporting the information. The processor system 1001 can transmit notifications and receive data, including program code, through the network(s), the network link 1014 and the communication interface 1013.

Obviously, numerous modifications and variations of the present invention are possible in light of the above teachings. It is therefore to be understood that within the scope of the appended claims, the invention may be practiced otherwise than as specifically described herein.

The invention claimed is:

1. A computer implemented method of purchasing a product from a seller that maintains anonymity of a buyer and a payment method used in a transaction between said buyer and said seller, comprising the steps of:
　　assigning, by said buyer using a computerized buyer device or by a computerized trusted third party system, an anonymous identifier to each of a plurality of different payment methods;
　　for each of said plurality of different payment methods, populating, by said computerized trusted third party system, a digital repository with data that is associated with said buyer, said data including a buyer identification indicator, the indicator corresponding to the respective payment method, and the anonymous identifier assigned to the respective payment method;

selecting, by said buyer using said computerized buyer device and the anonymous identifiers, one of said plurality of different payment methods for purchasing said product from said seller in said transaction between said buyer and said seller, said product having a total sale price;

receiving, by said computerized trusted third party system from said computerized buyer device, the anonymous identifier assigned to the selected payment method, the anonymous identifier being received as an anonymous payment method for said product that said buyer is purchasing;

transmitting, by said computerized trusted third party system to a computerized seller device, transactional data for purchasing said product that maintains anonymity of said buyer and the selected payment method, said transactional data including a transaction identifier identifying said transaction between said buyer and said seller;

receiving, by said computerized trusted third party system from said computerized seller device, a transaction processing request including said transaction identifier and said total sale price for payment approval of said product that said buyer is purchasing;

identifying, by said computerized trusted third party system, said transaction between said buyer and said seller using said transaction identifier;

in a querying step, querying, by said computerized trusted third party system using the received anonymous identifier, said digital repository to determine the selected payment method;

requesting, by said computerized trusted third party system, payment approval from a payment partner processor by providing said payment partner processor a description of the selected payment method determined in said querying step and said total sale price; and providing, by said computerized trusted third party system, said payment approval to said computerized seller device.

2. The method of claim 1, wherein said payment partner processor is a credit processor that receives credit approval from a credit approval authority.

3. The method of claim 1, wherein said payment partner processor is a credit approval authority.

4. The method of claim 1, wherein the selected payment method is one or more of a credit card, a debit card, an e-check, and a direct debit account.

5. The method of claim 1, wherein one or more of the anonymous identifiers is a nickname.

6. The method of claim 1, wherein one or more of the anonymous identifiers is a one-time use code.

7. The method of claim 1, wherein one or more of the anonymous identifiers is a unique code.

8. A computer implemented method of purchasing a product from a seller that maintains anonymity of a buyer and a payment method used in a transaction between said buyer and said seller, comprising the steps of:

establishing, by a computerized trusted third party system for said buyer, a prefunded cash account, said prefunded cash account corresponding to one of a plurality of different payment methods;

assigning, by said buyer using a computerized buyer device or by said computerized trusted third party system, an anonymous identifier to each of said plurality of different payment methods;

for each of said plurality of different payment methods, populating, by said computerized trusted third party system, a digital repository with data that is associated with said buyer, said data including a buyer identification indicator, the indicator corresponding to the respective payment method, and the anonymous identifier assigned to the respective payment method;

selecting, by said buyer using said computerized buyer device and the anonymous identifiers, one of said plurality of different payment methods for purchasing said product from said seller in said transaction between said buyer and said seller, said product having a total sale price;

receiving, by said computerized trusted third party system from said computerized buyer device, the anonymous identifier assigned to the selected payment method, the anonymous identifier being received as an anonymous payment method for said product that said buyer is purchasing;

transmitting, by said computerized trusted third party system to a computerized seller device, transactional data for the purchase of said product that maintains anonymity of said buyer and the selected payment method, said transactional data including a transaction identifier identifying said transaction between said buyer and said seller;

receiving, by said computerized trusted third party system from said computerized seller device, a transaction processing request including said transaction identifier and said total sale price for payment approval of said product that said buyer is purchasing;

identifying, by said computerized trusted third party system, said transaction between said buyer and said seller using said transaction identifier;

in a querying step, querying, by said computerized trusted third party system using the received anonymous identifier, said digital repository to determine the selected payment method; and in a paying step, in the event the selected payment method is determined to employ said prefunded cash account, paying, by said computerized trusted third party system, said seller an amount equal to said total sale price from said prefunded cash account.

9. The method of claim 8, wherein one or more of the anonymous identifiers is a nickname.

10. The method of claim 8, wherein one or more of the anonymous identifiers is a one-time use code.

11. The method of claim 8, wherein one or more of the anonymous identifiers is a unique code.

12. The method of claim 8, wherein the paying step comprises making micropayments to the seller.

13. A system for purchasing a product from a seller that maintains anonymity of a buyer and a payment method used in a transaction between said buyer and said seller, comprising:

means for assigning, by said buyer or said trusted third party, an anonymous identifier to each of a plurality of different payment methods;

means for populating, by the trusted third party for each of said plurality of different payment methods, a digital repository with data that is associated with said buyer, said data including a buyer identification indicator, the indicator corresponding to the respective payment method, and the anonymous identifier assigned to the respective payment method;

means for selecting, by said buyer using the anonymous identifiers, one of said plurality of different payment methods for purchasing said product from said seller in said transaction between said buyer and said seller, said product having a total sale price;

means for receiving, by said trusted third party from said buyer, the anonymous identifier assigned to the selected payment method, the anonymous identifier being received as an anonymous payment method for said product that said buyer is purchasing;

means for transmitting, by said trusted third party to a seller, transactional data for the purchase of said product that maintains anonymity of said buyer and the selected payment method, said transactional data including a transaction identifier identifying said transaction between said buyer and said seller;

means for receiving, by said trusted third party from said seller, a transaction processing request including said transaction identifier and said total sale price for payment approval of said product that said buyer is purchasing;

means for identifying, by said trusted third party, said transaction between said buyer and said seller using said transaction identifier;

means for querying, by said trusted third party using the received anonymous identifier, said digital repository to determine the selected payment method, means for requesting, by said trusted third party, payment approval from a payment partner by providing said payment partner a description of the selected payment method determined by said means for querying and said total sale price; and means for providing, by said computerized trusted third party system, said payment approval to the seller.

14. A computer implemented method of purchasing a product from at least one seller that maintains anonymity of a buyer and a payment method used in a transaction between said buyer and said seller, comprising the steps of:

assigning, by said buyer using a computerized buyer device or by a computerized trusted third party system, an anonymous identifier to each of a plurality of different payment methods;

assigning, by said computerized trusted third party system, at least one unique buyer-seller identifier, each corresponding to a unique combination of said buyer and said at least one seller;

in a populating step, for each of said plurality of different payment methods, populating, by said computerized trusted third party system, a digital repository with data that is associated with said buyer, said data including a buyer identification indicator, the indicator corresponding to the respective payment method, the anonymous identifier assigned to the respective payment method, and said at least one unique buyer-seller identifier, selecting, by said buyer using said computerized buyer device and the anonymous identifiers, one of said plurality of different payment methods for purchasing said product from said seller in said transaction between said buyer and said seller, said product having a total sale price, and wherein an appropriate one of said at least one unique buyer-seller identifier is received by one of at least one computerized seller device from said computerized buyer device, said appropriate one of said at least one unique buyer-seller identifier corresponding to said buyer and one of said at least one seller;

receiving, by said computerized trusted third party system from said computerized buyer device, the anonymous identifier assigned to the selected payment method, the anonymous identifier being received as an anonymous payment method for said product that said buyer is purchasing, said product having a total sale price;

transmitting, by said computerized trusted third party system to the respective computerized seller device, transactional data for the purchase of said product that maintains anonymity of said buyer and the selected payment method, said transactional data including a transaction identifier identifying said transaction between said buyer and said seller;

receiving, by said computerized trusted third party system from the respective computerized seller device, a transaction processing request including said transaction identifier and said total sale price for payment approval of said product that said buyer is purchasing;

identifying, by said computerized trusted third party system, said transaction between said buyer and said seller using said transaction identifier;

in a querying step, querying, by said computerized trusted third party system using the received anonymous identifier, said digital repository to determine the selected payment method, requesting, by said computerized trusted third party system, payment approval from a payment partner processor by providing said payment partner processor a description of the selected payment method determined in said querying step and said total sale price;

providing, by said computerized trusted third party system, said payment approval to the respective computerized seller device;

receiving, by said computerized trusted third party system from the respective computerized seller device, said appropriate one of said at least one unique buyer-seller identifier as a request for a communication of a message to said buyer; and forwarding, by said computerized trusted third party system, said message to said computerized buyer device by determining an identity of said buyer using said appropriate one of said at least one unique buyer-seller identifier received in said request for said communication of said message to said buyer.

15. The method of claim 14, wherein the payment partner processor is a credit processor that receives credit approval from a credit approval authority.

16. The method of claim 14, wherein the payment partner processor is a credit approval authority.

17. The method of claim 14, wherein the selected payment method is at least one of a credit card, a debit card, an e-check, and a direct debit account.

18. The method of claim 14, wherein one or more of the anonymous identifiers is a nickname.

19. The method of claim 14, wherein one or more of the anonymous identifiers is a one-time use code.

20. The method of claim 14, wherein one or more of the anonymous identifiers is a unique code.

21. The method of claim 14, further comprising the steps of:

receiving, by said computerized trusted third party system, an e-mail address for use in anonymous communications with said at least one seller, wherein said populating step comprises populating said digital repository with said e-mail address, and said message forwarded to said computerized buyer device is an e-mail message sent to said e-mail address.

22. A computer implemented method of purchasing a product from a seller that maintains anonymity of a buyer and a payment method used in a transaction between said buyer and said seller, comprising the steps of:

assigning, by said buyer using a computerized buyer device or by a computerized trusted third party system, an anonymous identifier to each of a plurality of different payment methods;

selecting, by said buyer using said computerized buyer device and the anonymous identifiers, one of said plurality of different payment methods for purchasing said product from said seller in said transaction between said buyer and said seller, said product having a total sale price;

receiving, by said computerized trusted third party system from said computerized buyer device, the anonymous identifier assigned to the selected payment method, the anonymous identifier being received as an anonymous payment method for said product that said buyer is purchasing;

transmitting, by said computerized trusted third party system to a computerized seller device, transactional data for the purchase of said product that maintains anonymity of said buyer and the selected payment method, said transactional data including a transaction identifier identifying said transaction between said buyer and said seller;

receiving, by said computerized trusted third party system from said computerized seller device, a transaction processing request including said transaction identifier and said total sale price for payment approval of said product that said buyer is purchasing;

identifying, by said computerized trusted third party system, said transaction between said buyer and said seller using said transaction identifier;

retrieving, by said computerized trusted third party system, a description of the selected payment method from a database using the received anonymous identifier;

requesting, by said computerized trusted third party system, payment approval from a payment partner processor by providing said payment partner processor said description of the selected payment method and said total sale price; and controlling, by said computerized trusted third party system, payment to said seller using the selected payment method.

* * * * *

UNITED STATES PATENT AND TRADEMARK OFFICE
CERTIFICATE OF CORRECTION

PATENT NO. : 7,636,696 B1  Page 1 of 1
APPLICATION NO. : 09/715176
DATED : December 22, 2009
INVENTOR(S) : Sigler, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1292 days.

Signed and Sealed this

Ninth Day of November, 2010

David J. Kappos
*Director of the United States Patent and Trademark Office*